United States Patent
Djebara et al.

(10) Patent No.: US 9,905,368 B2
(45) Date of Patent: Feb. 27, 2018

(54) MULTIPLE LEADWIRES USING CARRIER WIRE FOR LOW ESR ELECTROLYTIC CAPACITORS

(71) Applicant: AVX Corporation, Fountain Inn, SC (US)

(72) Inventors: Lotfi Djebara, Paris (FR); Ludek Kubes, Lanskroun (CZ); Radek Matousek, Moravska Trebova (CZ); Stanislav Zednicek, Lanskroun (CZ)

(73) Assignee: AVX Corporation, Fountain Inn, SC (US)

( * ) Notice: Subject to any disclaimer, the term of this patent is extended or adjusted under 35 U.S.C. 154(b) by 121 days.

(21) Appl. No.: 14/817,507

(22) Filed: Aug. 4, 2015

(65) Prior Publication Data
US 2017/0040116 A1 Feb. 9, 2017

(51) Int. Cl.
*H01G 9/052* (2006.01)
*H01G 9/15* (2006.01)
(Continued)

(52) U.S. Cl.
CPC .......... *H01G 9/052* (2013.01); *H01G 9/0032* (2013.01); *H01G 9/025* (2013.01); *H01G 9/07* (2013.01); *H01G 9/15* (2013.01)

(58) Field of Classification Search
CPC ........ H01G 9/052; H01G 9/0032; H01G 9/07; H01G 9/025
See application file for complete search history.

(56) References Cited

U.S. PATENT DOCUMENTS 3,341,752 A * 9/1967 Fournier ............... H01G 9/012
174/50.63
3,345,545 A 10/1967 Bourgault et al.
(Continued)

FOREIGN PATENT DOCUMENTS

JP          S57-18317 A       1/1982
JP      2004349725 A   * 12/2004
(Continued)

OTHER PUBLICATIONS

Abstract of Japanese Patent—JP2001057319 A, Feb. 27, 2001, 2 pages.
(Continued)

*Primary Examiner* — David M Sinclair
(74) *Attorney, Agent, or Firm* — Dority & Manning, P.A.

(57) ABSTRACT

A solid electrolytic capacitor including a capacitor element, a first anode lead, a second anode lead, and a carrier wire. The capacitor element includes a sintered, porous anode body; a dielectric layer overlying the sintered, porous anode body; and a cathode overlying the dielectric layer that includes a solid electrolyte. The first and second anode leads each have an embedded portion positioned within the anode body and an external portion extending longitudinally from a surface of the anode body in an x-direction, while the carrier wire is positioned external to the anode body. Further, a first portion of the carrier wire is connected to the external portions of the first and second anode leads, while a second portion of the carrier wire extends longitudinally away from the surface of the anode body in the x-direction. Such an arrangement reduces the ESR and leakage current of the capacitor.

19 Claims, 17 Drawing Sheets

(51) Int. Cl.
  *H01G 9/00*    (2006.01)
  *H01G 9/025*   (2006.01)
  *H01G 9/07*    (2006.01)

(56)           References Cited

U.S. PATENT DOCUMENTS

| | | | | |
|---|---|---|---|---|
| 3,349,294 | A | * | 10/1967 | Heinimann ............... H01G 2/12 361/540 |
| 3,586,924 | A | * | 6/1971 | Gebert .................. H01G 9/0029 361/529 |
| 3,612,957 | A | * | 10/1971 | Steigerwald ........... H01G 9/008 29/25.03 |
| 4,001,656 | A | * | 1/1977 | Voyles .................. H01G 9/012 361/540 |
| 4,097,916 | A | | 6/1978 | Piper |
| 4,330,929 | A | | 5/1982 | Cripe |
| 4,409,642 | A | | 10/1983 | Edson |
| 4,797,788 | A | * | 1/1989 | Dekker ................. H01G 9/008 361/540 |
| 4,945,452 | A | | 7/1990 | Sturmer et al. |
| 5,111,327 | A | | 5/1992 | Blohm et al. |
| 5,179,507 | A | | 1/1993 | Iijima |
| 5,457,862 | A | | 10/1995 | Sakata et al. |
| 5,469,326 | A | | 11/1995 | Kanetake |
| 5,473,503 | A | | 12/1995 | Sakata et al. |
| 5,729,428 | A | | 3/1998 | Sakata et al. |
| 5,812,367 | A | | 9/1998 | Kudoh et al. |
| 5,949,639 | A | | 9/1999 | Maeda et al. |
| 6,191,936 | B1 | | 2/2001 | Webber et al. |
| 6,197,252 | B1 | | 3/2001 | Bishop et al. |
| 6,322,912 | B1 | | 11/2001 | Fife |
| 6,391,275 | B1 | | 5/2002 | Fife |
| 6,416,730 | B1 | | 7/2002 | Fife |
| 6,447,570 | B1 | | 9/2002 | Pozdeev-Freeman |
| 6,527,937 | B2 | | 3/2003 | Fife |
| 6,576,099 | B2 | | 6/2003 | Kimmel et al. |
| 6,592,740 | B2 | | 7/2003 | Fife |
| 6,635,729 | B1 | | 10/2003 | Groenendaal et al. |
| 6,639,787 | B2 | | 10/2003 | Kimmel et al. |
| 6,665,172 | B1 | | 12/2003 | Kim et al. |
| 6,674,635 | B1 | | 1/2004 | Fife et al. |
| 6,987,663 | B2 | | 1/2006 | Merker et al. |
| 7,072,171 | B1 | * | 7/2006 | Muffoletto ............. H01G 9/04 29/25.03 |
| 7,116,548 | B2 | | 10/2006 | Satterfield, Jr. et al. |
| 7,154,742 | B1 | | 12/2006 | Hahn et al. |
| 7,220,397 | B2 | | 5/2007 | Kimmel et al. |
| 7,262,511 | B2 | | 8/2007 | Osako et al. |
| 7,341,705 | B2 | | 3/2008 | Schnitter |
| 7,342,775 | B2 | | 3/2008 | Hahn et al. |
| 7,359,181 | B2 | | 4/2008 | Kuriyama |
| 7,381,396 | B2 | | 6/2008 | Thomas et al. |
| 7,419,926 | B2 | | 9/2008 | Schnitter et al. |
| 7,515,396 | B2 | | 4/2009 | Biler |
| 7,594,937 | B2 | | 9/2009 | Amita et al. |
| 7,646,589 | B2 | | 1/2010 | Kuriyama |
| 7,787,235 | B2 | | 8/2010 | Fujita et al. |
| 7,929,274 | B2 | | 4/2011 | Reed et al. |
| 8,066,783 | B2 | | 11/2011 | Takeda |
| 8,313,538 | B2 | | 11/2012 | Merker et al. |
| 8,482,902 | B2 | | 7/2013 | Ishida et al. |
| 8,630,084 | B2 | | 1/2014 | Saida et al. |
| 8,760,852 | B2 | | 6/2014 | Djebara et al. |
| 8,947,858 | B2 | | 2/2015 | Djebara et al. |
| 2004/0136144 | A1 | | 7/2004 | Hirota et al. |
| 2005/0237698 | A1 | | 10/2005 | Postage et al. |
| 2009/0103243 | A1 | | 4/2009 | Mizukoshi et al. |
| 2009/0237867 | A1 | | 9/2009 | Kurokawa |
| 2009/0279232 | A1 | * | 11/2009 | Druding ................. H01G 9/008 361/528 |
| 2010/0079930 | A1 | * | 4/2010 | Hayashi ................. H01G 9/012 361/534 |
| 2011/0085285 | A1 | | 4/2011 | Zednicek et al. |
| 2013/0279077 | A1 | * | 10/2013 | Djebara ................. H01G 9/012 361/528 |
| 2013/0279078 | A1 | * | 10/2013 | Djebara ................. H01G 9/012 361/528 |
| 2013/0321985 | A1 | | 12/2013 | Djebara et al. |
| 2013/0321986 | A1 | | 12/2013 | Diebara et al. |
| 2016/0181022 | A1 | | 6/2016 | Diebara et al. |

FOREIGN PATENT DOCUMENTS

| | | |
|---|---|---|
| WO | WO 98/49356 | 11/1998 |
| WO | WO 2005/106905 A1 | 11/2005 |
| WO | WO 2006/057455 A1 | 6/2006 |

OTHER PUBLICATIONS

Abstract of Japanese Patent—JP2001217160 A, Aug. 10, 2001, 2 pages.
Abstract of Japanese Patent—JP2001307957 A, Nov. 2, 2001, 2 pages.
Abstract of Japanese Patent—JP2003332173 A, Nov. 21, 2003, 2 pages.
Hahn et al., "Strategies for Manfacturing Ultra Low ESR Ta Capacitors," CARTS USA, Mar. 21-24, 2005, Palm Springs, California, 7 pages.
Abstract of Japanese Patent—JPH03196511A, Aug. 28, 1991, 1 page.
Abstract of Japanese Patent—JP2003217974A, Jul. 31, 2003, 2 pages.
Abstract of Japanese Patent—JP2004349725A, Dec. 9, 2004, 2 pages.
Abstract of Japanese Patent—JP2011071151A, Apr. 7, 2011, 1 page.
Related U.S. Patent Application Form.
Abstract of Japanese Patent—JPH6722289 A, Jan. 24, 1995. 2 pages.
Abstract of Japanese Patent—JPH088143 A, Jan. 12, 1996, 2 pages.
Abstract of Japanese Patent—JP2000012387 A, Jan. 14, 2000, 2 pages.
Abstract of Japanese Patent—JP2003229327 A, Aug. 15, 2013, 2 pages.
Abstract of Japanese Patent—JP2004253501 A, Sep. 9, 2004, 1 page.
Abstract of Japanese Patent—JP2004281619 A, Oct. 7, 2004, 1 page.
Abstract of Japanese Patent—JP2005033097 A, Feb. 3, 2005, 2 pages.
Abstract of Japanese Patent—JP2006295075 A, Oct. 26, 2006, 1 page.
Abstract of Japanese Patent—JP2008187091 A, Aug. 14. 2008, 2 pages.
Abstract of Japanese Patent—JP2008305824 A, Dec. 18, 2008, 2 pages.
Abstract of Japanese Patent—JP2009266931 A, Nov. 12, 2009, 2 pages.
Hintz et al., "Anode Lead Wire Pre-Treatments for Improved Lead Wire Bonding in Tantalum Capacitor Anodes Processed by De-Oxidation/Sintering," CARTS USA, Mar. 15-18, 2010, New Orleans, Louisiana, 13 pages.
Vasina et al., "Failure Modes of Tantalum Capacitors Made by Different Technologies," CARTS USA, Mar./Apr. 2001, 6 pages.
Abstract of Japanese Patent—JPH03196511 A, Aug. 8, 1991, 1 page.

* cited by examiner

MULTIPLE LEADWIRES USING CARRIER WIRE FOR LOW ESR ELECTROLYTIC CAPACITORS

BACKGROUND OF THE INVENTION

Solid electrolytic capacitors (e.g., tantalum capacitors) have been a major contributor to the miniaturization of electronic circuits and have made possible the application of such circuits in extreme environments. The anode of a typical solid electrolytic capacitor includes a porous anode body, with an anode lead extending beyond the anode body and connected to an anode termination of the capacitor. The anode can be formed by first pressing a tantalum powder into a pellet that is then sintered to create fused connections between individual powder particles. One problem with many conventional solid electrolytic capacitors is that the small particle size of the tantalum particles can decrease the volumetric contact between the anode body and the anode lead. In fact, it can be difficult to find many points of contact between the anode lead and the powder particles. When the contact area between the anode body and the anode lead is decreased, there is a corresponding increase in resistance where the anode lead and the anode meet. This increased equivalent series resistance (ESR) results in a capacitor exhibiting decreased electrical capabilities. The use of anode leads with an increased diameter or the use of multiple anode leads can be used to decrease the ESR. However, as the diameter of the anode lead(s) is increased, the internal resistance in the anode lead(s) increases, and this increase in internal resistance can counteract any improvement (decrease) in ESR seen as the result of increasing the points of contact between the anode body and the anode lead(s). Further, increasing the diameter of the anode lead(s) increases the energy required to resistance weld or laser weld the anode lead to an anode termination portion of a leadframe.

As such, a need currently exists for an improved solid electrolytic capacitor that finds a balance between the benefit of increased points of contact between the anode body and two or more anode leads without the negative effects of increased resistance in the anode leads as the diameter of the leads increases, thereby significantly improving electrical capabilities of the capacitor by achieving ultralow ESR levels. A need also exists where such a balance can be found while also minimizing the energy needed to electrically connect the anode lead to an anode termination.

SUMMARY OF THE INVENTION

In accordance with one embodiment of the present invention, a solid electrolytic capacitor is disclosed that includes a capacitor element, a first anode lead, a second anode lead, and a carrier wire. The capacitor element includes a sintered, porous anode body; a dielectric layer overlying the sintered, porous anode body; and a cathode overlying the dielectric layer that includes a solid electrolyte. Additionally, the first anode lead has an embedded portion positioned within the sintered, porous anode body and an external portion extending longitudinally from a surface of the sintered, porous anode body in an x-direction. Likewise, the second anode lead has an embedded portion positioned within the sintered, porous anode body and an external portion extending longitudinally from a surface of the sintered, porous anode body in an x-direction. Meanwhile, the carrier wire is positioned external to the sintered, porous anode body. A first portion of the carrier wire is connected to the external portion of the first anode lead and the external portion of the second anode lead, and a second portion of the carrier wire extends longitudinally away from the surface of the sintered, porous anode body in the x-direction.

In accordance with another embodiment of the present invention, a method for forming a solid electrolytic capacitor is disclosed. The method includes positioning a first anode lead and a second anode lead within a powder formed from a valve metal composition, wherein the first anode lead includes an embedded portion located within a porous anode body and an external portion extending longitudinally from a surface of the porous anode body in an x-direction, and wherein the second anode lead includes an embedded portion located within a porous anode body and an external portion extending from a surface of the porous anode body in a longitudinal direction; compacting the powder around the embedded portion of the first anode lead and the embedded portion of the second anode lead; sintering the compacted powder to form a sintered, porous anode body; and positioning a carrier wire external to the sintered, porous anode body, wherein the carrier wire comprises a first portion and a second portion. The method further includes connecting the first portion of the carrier wire to the first anode lead and the second anode lead; and connecting the second portion of the carrier wire to an anode termination to form an electrical connection between the second portion of the carrier wire and the anode termination, further wherein the second portion of the carrier wire extends longitudinally away from the surface of the sintered, porous anode body in the x-direction.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Figure 1:
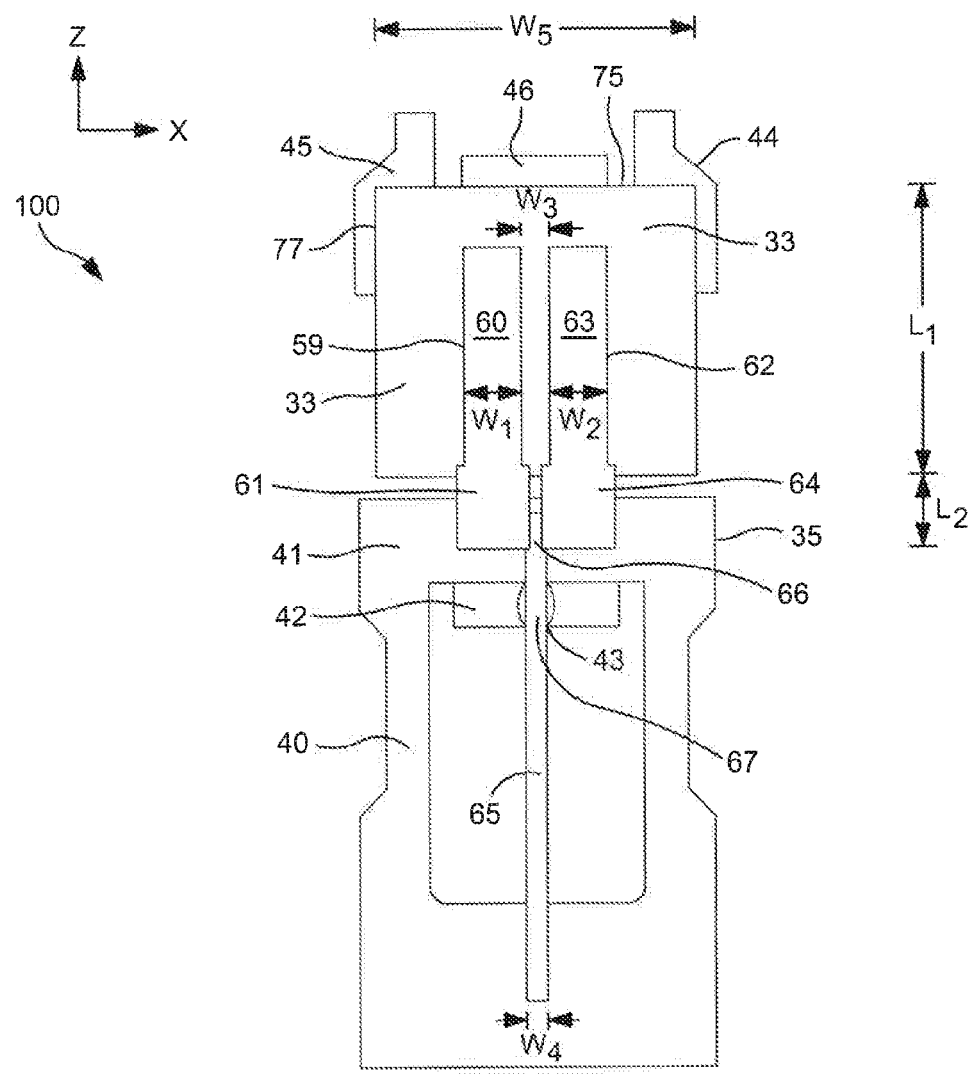
FIG. 1 is a top view of one embodiment of an electrolytic capacitor of the present invention.

Repeat use of reference characters in the present specification and drawings is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended to limit the broader aspects of the present invention.

Generally speaking, the present invention is directed to a solid electrolytic capacitor containing a capacitor element that includes a sintered porous anode body, a dielectric layer overlying the sintered porous anode body, and a cathode overlying the dielectric layer that includes a solid electrolyte. The capacitor also includes a first anode lead and a second anode lead. The first anode lead and the second anode lead each have an embedded portion positioned within the porous anode body and an external portion extending from a surface of the porous anode body in a longitudinal direction. The capacitor also includes a carrier wire positioned external to the sintered, porous anode body, wherein a first portion of the carrier wire is connected to the external portion of the first anode lead and the external portion of the second anode lead, wherein a second portion of the carrier wire extends longitudinally away from the surface of the sintered, porous anode body in the x-direction. The present inventors have found that the use of two or more anode leads embedded within the anode body can reduce the ESR of the resulting capacitor compared to when a single anode lead is embedded within the anode body due to increased points of contact between the anode lead material and the anode body. Further, the particular arrangement of the carrier wire can further reduce the ESR of the resulting capacitor, where a first portion of the carrier wire is positioned between and connected to the external portions of the first and second anode leads. Moreover, utilizing a carrier wire where the second portion of the carrier wire has a diameter that is smaller than a diameter of the first anode lead and a diameter of the second anode lead can further reduce the ESR by limiting the overall internal resistance attributed to the first anode lead and the second lead. In addition, the carrier wire facilitates reduction in the energy required to electrically connect the anode body to the anode termination.

Furthermore, the particular arrangement of the embedded portions of the first anode lead and the second anode lead can reduce the leakage current (DCL) of the resulting capacitor. For instance, in one particular embodiment, a part of the embedded portion of the first anode lead, the second anode lead, or both can be flattened, or pinched, which can reduce the DCL of the resulting capacitor. Additionally, using a carrier wire having a smaller diameter than the first anode lead and the second anode lead to carry the anodes during chemical processes such as anodization and cathode buildup can reduce material costs, as a portion of the carrier wire can be eventually trimmed away from the capacitor itself and is not needed as a component of the final capacitor product.

Various embodiments of the present invention will now be described in more detail.

I. Capacitor Element

The capacitor element of the present invention includes an anode, a dielectric layer, and a cathode, as well as optional additional layers, each of which are each described in more detail below.

A. Anode

The porous anode body of the capacitor of the present invention can typically be formed from a valve metal composition having a high specific charge, such as about 2,000 µF*V/g or more, in some embodiments about 5,000 µF*V/g or more, in some embodiments about 10,000 µF*V/g or more. For instance, such powders can have a specific charge of from about 10,000 to about 600,000 µF*V/g, in some embodiments from about 40,000 to about 500,000 µF*V/g, in some embodiments from about 70,000 to about 400,000 µF*V/g, in some embodiments from about 100,000 to about 350,000 µF*V/g, and in some embodiments, from about 150,000 to about 300,000 µF*V/g. As is known in the art, the specific charge may be determined by multiplying capacitance by the anodizing voltage employed, and then dividing this product by the weight of the anodized electrode body.

The valve metal composition contains a valve metal (i.e., a metal that is capable of oxidation) or a valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. For example, the niobium oxide may be $NbO_{0.7}$, $NbO_{1.0}$, $NbO_{1.1}$, and $NbO_2$. In a preferred embodiment, the composition contains $NbO_{1.0}$, which is a conductive niobium oxide that may remain chemically stable even after sintering at high temperatures. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife, et al.; and U.S. Pat. No. 6,639,787 to Kimmel, et al.; and U.S. Pat. No. 7,220,397 to Kimmel, et al.; as well as U.S. Patent Application Publication No. 2005/0019581 to Schnitter; U.S. Patent Application Publication No. 2005/0103638 to Schnitter, et al.; U.S. Patent Application Publication No. 2005/0013765 to Thomas, et al.; all of which are incorporated herein in their entirety by reference thereto for all purposes.

To form the anode, a powder of the valve metal composition is generally employed. The powder may contain particles any of a variety of shapes, such as nodular, angular, flake, etc., as well as mixtures thereof. Particularly suitable powders are tantalum powders available from Cabot Corp. (e.g., C255 flake powder, TU4D flake/nodular powder, etc.) and H.C. Starck (e.g., NH175 nodular powder). Although not required, the powder may be agglomerated using any technique known in the art, such as through heat treatment. Prior to forming the powder into the shape of an anode, it may also be optionally mixed with a binder and/or lubricant to ensure that the particles adequately adhere to each other when pressed to form the anode body. The resulting powder may then be compacted to form a pellet using any conventional powder press device. For example, a press mold may be employed that is a single station compaction press containing a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing.

Regardless of its particular composition, referring to FIG. 1, for example, the powder is compacted around at least an embedded portion 60 of a first anode lead 59 and an embedded portion 63 of a second anode lead 62 so that an external portion 61 of the first anode lead 59 and an external portion 64 of the second anode lead 62 extend from the compacted porous anode body 3, as will be discussed in more detail below. It should be understood, however, that the powder can be compacted around greater than two anode leads, such 3 anode leads, 4 anode leads, 5 anode leads, or more. In one particular embodiment, a press mold may be employed that includes a die having two or more portions (e.g., upper and lower portions). During use, the portions of the die may be placed adjacent to each other so that their walls are substantially aligned to form a die cavity having the desired shape of the anode. Before, during, and/or after loading a certain quantity of powder into the die cavity, the embedded portion 60 of the first anode lead 59 and the embedded portion 63 of the second anode lead 62 may be embedded therein. The die may define a single or multiple slots that allow for the insertion of the anode leads. After filling the die with powder and embedding the first anode lead and the second anode lead therein, the die cavity may then be closed and subjected to compressive forces by a punch. Typically, the compressive forces are exerted in a direction that is either generally parallel or generally perpendicular to the length of the first anode lead, which extends in the longitudinal direction axis (i.e., the z-axis in FIGS. 1-18). This forces the particles into close contact with the first anode lead and the second anode lead to help create a strong lead-to-powder bond.

Any binder/lubricant may be removed after pressing by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes. Thereafter, the porous anode body is sintered to form a porous, integral mass. The pellet is typically sintered at a temperature of from about 1200° C. to about 2000° C., in some embodiments from about 1300° C. to about 1900° C., and in some embodiments, from about 1500° C. to about 1800° C., for a time of from about 5 minutes to about 100 minutes, and in some embodiments, from about 30 minutes to about 60 minutes. If desired, sintering may occur in an atmosphere that limits the transfer of oxygen atoms to the anode. For example, sintering may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may also be employed.

In the particular embodiments shown in FIGS. 1-18, the sintered, porous anode body 33 is in the shape of a square or rectangular pellet. In addition to having a square or rectangular shape, however, the anode can have a cubed, cylindrical, circular, or any other geometric shape. The anode may also be "fluted" in that it may contain one or more furrows, grooves, depressions, or indentations to increase the surface to volume ratio to minimize ESR and extend the frequency response of the capacitor. Such "fluted" anodes are described, for instance, in U.S. Pat. No. 6,191,936 to Webber, et al.; U.S. Pat. No. 5,949,639 to Maeda, et al.; and U.S. Pat. No. 3,345,545 to Bourgault et al., as well as U.S. Patent Application Publication No. 2005/0270725 to Hahn et al., of which are incorporated herein in their entirety by reference thereto for all purposes.

Referring to FIGS. 1-18, various capacitors of the present disclosure can include a porous anode body 33 with at least a first anode lead 59, a second anode lead 62 as discussed above, in conjunction with at least one carrier wire 65, as discussed in more detail below. As shown in FIGS. 16-17, the porous anode body 33 (and capacitor element formed therefrom) can have a front surface 74, a rear surface 75, an upper surface 76, and a lower surface 77, a first side surface 78, and a second side surface 79. Referring to FIGS. 1 and 16-17, the porous anode body 33 can also have a width $W_5$ that can refer, for example, to the width of the front surface 74 along the x-direction, a length $L_1$ that can refer, for example, to the length of the first side surface 78 or the second side surface 79 in the z-direction, and a height $H_1$ that can refer, for example, to the height or thickness of the front surface 36 along the y-direction. The width $W_5$ of the front surface 74 of the porous anode body 33 can range from about 0.5 millimeters to about 6 millimeters, such as from about 0.75 millimeters to about 5 millimeters, such as from about 1 millimeter to about 4 millimeters. Further, the length $L_1$ of the first side surface 78 or the second side surface 79 in the z-direction can range from about 0.25 millimeters to about 5 millimeters, such as from about 0.5 millimeters to about 4 millimeters, such as from about 0.75 millimeters to about 3 millimeters. Additionally, the height $H_1$ of the front surface 74 of the porous anode body 33 in the y-direction can range from about 0.2 millimeters to about 4 millimeters, such as from about 0.4 millimeters to about 3 millimeters, such as from about 0.6 millimeters to about 2 millimeters.

B. Dielectric

Although not shown, it is to be understood that a dielectric overlies or coats the porous anode body. The dielectric may be formed by anodically oxidizing ("anodizing") the sintered anode so that a dielectric layer is formed over and/or within the anode body. For example, a tantalum (Ta) anode body may be anodized to tantalum pentoxide ($Ta_2O_5$). Typically, anodization is performed by initially applying a solution to the anode body, such as by dipping the anode body into the electrolyte. A solvent is generally employed, such as water (e.g., deionized water). To enhance ionic conductivity, a compound may be employed that is capable of dissociating in the solvent to form ions. Examples of such compounds include, for instance, acids, such as described below with respect to the electrolyte. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the anodizing solution. If desired, blends of acids may also be employed.

A current is passed through the anodizing solution to form the dielectric layer. The value of the formation voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode body. Of course, other known methods may also be employed, such as pulse or step potentiostatic methods. The voltage at which anodic oxidation occurs typically ranges from about 4 to about 250 V, and in some embodiments, from about 9 to about 200 V, and in some embodiments, from about 20 to about 150 V. During oxidation, the anodizing solution can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode body and within its pores.

C. Solid Electrolyte

The capacitor element also contains a solid electrolyte that functions as the cathode for the capacitor. A manganese dioxide solid electrolyte may, for instance, be formed by the pyrolytic decomposition of manganous nitrate ($Mn(NO_3)_2$). Such techniques are described, for instance, in U.S. Pat. No. 4,945,452 to Sturmer, et al., which is incorporated herein in its entirety by reference thereto for all purposes.

Alternatively, the solid electrolyte may be formed from one or more conductive polymer layers. The conductive polymer(s) employed in such can be π-conjugated and have electrical conductivity after oxidation or reduction, such as an electrical conductivity of at least about 1 μS cm$^{-1}$ after oxidation. Examples of such π-conjugated conductive polymers include, for instance, polyheterocycles (e.g., polypyrroles, polythiophenes, polyanilines, etc.), polyacetylenes, poly-p-phenylenes, polyphenolates, and so forth. Particularly suitable conductive polymers are substituted polythiophenes having the following general structure:

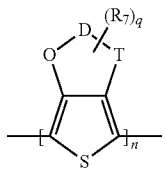

wherein,

T is O or S;

D is an optionally substituted $C_1$ to $C_5$ alkylene radical (e.g., methylene, ethylene, n-propylene, n-butylene, n-pentylene, etc.);

$R_7$ is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and q is an integer from 0 to 8, in some embodiments, from 0 to 2, and in one embodiment, 0; and n is from 2 to 5,000, in some embodiments from 4 to 2,000, and in some embodiments, from 5 to 1,000. Example of substituents for the radicals "D" or "$R_7$" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

Particularly suitable thiophene polymers are those in which "D" is an optionally substituted $C_2$ to $C_3$ alkylene radical. For instance, the polymer may be optionally substituted poly(3,4-ethylenedioxythiophene), which has the following general structure:

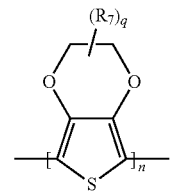

Methods for forming conductive polymers, such as described above, are well known in the art. For instance, U.S. Pat. No. 6,987,663 to Merker, et al., which is incorporated herein in its entirety by reference thereto for all purposes, describes various techniques for forming substituted polythiophenes from a monomeric precursor. The monomeric precursor may, for instance, have the following structure:

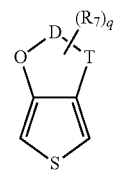

wherein,

T, D, $R_7$, and q are defined above. Particularly suitable thiophene monomers are those in which "D" is an optionally substituted $C_2$ to $C_3$ alkylene radical. For instance, optionally substituted 3,4-alkylenedioxythiophenes may be employed that have the general structure:

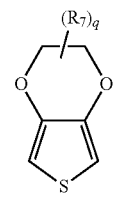

wherein, $R_7$ and q are as defined above. In one particular embodiment, "q" is 0. One commercially suitable example of 3,4-ethylenedioxythiophene is available from Heraeus Clevios under the designation Clevios™ M. Other suitable monomers are also described in U.S. Pat. No. 5,111,327 to Blohm et al. and U.S. Pat. No. 6,635,729 to Groenendaal, et al., which are incorporated herein in their entirety by reference thereto for all purposes. Derivatives of these monomers may also be employed that are, for example, dimers or trimers of the above monomers. Higher molecular derivatives, i.e., tetramers, pentamers, etc. of the monomers are also suitable for use in the present invention. The derivatives may be made up of identical or different monomer units and used in pure form and in a mixture with one another and/or with the monomers. Oxidized or reduced forms of these precursors may also be employed.

The thiophene monomers may be chemically polymerized in the presence of an oxidative catalyst. The oxidative catalyst typically includes a transition metal cation, such as iron(III), copper(II), chromium(VI), cerium(IV), manganese (IV), manganese(VII), or ruthenium(III) cations, and etc. A dopant may also be employed to provide excess charge to the conductive polymer and stabilize the conductivity of the polymer. The dopant typically includes an inorganic or organic anion, such as an ion of a sulfonic acid. In certain embodiments, the oxidative catalyst employed in the precursor solution has both a catalytic and doping functionality in that it includes a cation (e.g., transition metal) and an anion (e.g., sulfonic acid). For example, the oxidative catalyst may be a transition metal salt that includes iron(III) cations, such as iron(III) halides (e.g., $FeCl_3$) or iron(III) salts of other inorganic acids, such as $Fe(ClO_4)_3$ or $Fe_2(SO_4)_3$ and the iron(III) salts of organic acids and inorganic acids comprising organic radicals. Examples of iron (III) salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of iron(III) salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned iron(III) salts may also be used. Iron(III)-p-toluene sulfonate, iron(III)-o-toluene sulfonate, and mixtures thereof, are particularly suitable. One commercially suitable example of iron(III)-p-toluene sulfonate is available from Heraeus Clevios under the designation Clevios™ C.

Various methods may be utilized to form a conductive polymer layer. In one embodiment, the oxidative catalyst and monomer are applied, either sequentially or together, such that the polymerization reaction occurs in situ on the anode part. Suitable application techniques that may include screen-printing, dipping, electrophoretic coating, and spraying may be used to form a conductive polymer coating. As an example, the monomer may initially be mixed with the oxidative catalyst to form a precursor solution. Once the mixture is formed, it may be applied to the anode part and then allowed to polymerize so that the conductive coating is formed on the surface. Alternatively, the oxidative catalyst and monomer may be applied sequentially. In one embodiment, for example, the oxidative catalyst is dissolved in an organic solvent (e.g., butanol) and then applied as a dipping solution. The anode part may then be dried to remove the solvent therefrom. Thereafter, the part may be dipped into a solution containing the monomer.

Polymerization may be typically performed at temperatures of from about −10° C. to about 250° C., and in some embodiments, from about 0° C. to about 200° C., depending on the oxidizing agent used and desired reaction time. Suitable polymerization techniques, such as described above, may be described in more detail in U.S. Pat. No. 7,515,396 to Biler. Still other methods for applying such conductive coating(s) may be described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh et al., which are incorporated herein in their entirety by reference thereto for all purposes.

In addition to in situ application, a conductive polymer layer may also be applied in the form of a dispersion of conductive polymer particles. Although the particle size may vary, it is typically desired that the particles possess a small diameter to increase the surface area available for adhering to the anode part. For example, the particles may have an average diameter of from about 1 nanometer to about 500 nanometers, in some embodiments from about 5 nanometers to about 400 nanometers, and in some embodiments, from about 10 nanometers to about 300 nanometers. The $D_{90}$ value of the particles (particles having a diameter of less than or equal to the $D_{90}$ value constitute 90% of the total volume of all of the solid particles) may be about 15 micrometers or less, in some embodiments about 10 micrometers or less, and in some embodiments, from about 1 nanometer to about 8 micrometers. The diameter of the particles may be determined using known techniques, such as by ultracentrifuge, laser diffraction, etc.

The formation of the conductive polymer into a particulate form may be enhanced by using a separate counterion to counteract the positive charge carried by the substituted polythiophene. In some cases, the polymer may possess positive and negative charges in the structural unit, with the positive charge being located on the main chain and the negative charge optionally on the substituents of the radical "R", such as sulfonate or carboxylate groups. The positive charges of the main chain may be partially or wholly saturated with the optionally present anionic groups on the radicals "R." Viewed overall, the polythiophenes may, in these cases, be cationic, neutral or even anionic. Nevertheless, they are all regarded as cationic polythiophenes as the polythiophene main chain has a positive charge.

The counterion may be a monomeric or polymeric anion. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic $C_1$ to $C_{20}$ carboxylic acids (e.g., 2-ethyl-hexylcarboxylic acid); aliphatic perfluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchlorates, hexafluoroantimonates, hexafluoroarsenates or hexachloroantimonates); and so forth. Particularly suitable counterions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2,000 to about 500,000.

When employed, the weight ratio of such counterions to substituted polythiophenes in a given layer is typically from about 0.5:1 to about 50:1, in some embodiments from about 1:1 to about 30:1, and in some embodiments, from about 2:1 to about 20:1. The weight of the substituted polythiophene referred to in the above-referenced weight ratios refers to the weighed-in portion of the monomers used, assuming that a complete conversion occurs during polymerization.

The dispersion may also contain one or more binders to further enhance the adhesive nature of the polymeric layer and also increase the stability of the particles within the dispersion. The binders may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine formaldehyde resins, epoxide resins, silicone resins or celluloses. Crosslinking agents may also be employed to enhance the adhesion capacity of the binders. Such crosslinking agents may include, for instance, melamine compounds, masked isocyanates or functional silanes, such as 3-glycidoxypropyltrialkoxysilane, tetraethoxysilane and tetraethoxysilane hydrolysate or crosslinkable polymers, such as polyurethanes, polyacrylates or polyolefins. Other components may also be included within the dispersion as is known in the art, such as dispersion agents (e.g., water), surface-active substances, etc.

If desired, one or more of the above-described application steps may be repeated until the desired thickness of the coating is achieved. In some embodiments, only a relatively thin layer of the coating is formed at a time. The total target thickness of the coating may generally vary depending on the desired properties of the capacitor. Typically, the resulting conductive polymer coating has a thickness of from about 0.2 micrometers to about 50 micrometers, in some embodiments from about 0.5 micrometers to about 20 micrometers, and in some embodiments, from about 1 micrometer to about 5 micrometers. It should be understood that the thickness of the coating is not necessarily the same at all locations on the anode part. Nevertheless, the average thickness of the coating on the substrate generally falls within the ranges noted above.

The conductive polymer layer may optionally be healed. Healing may occur after each application of a conductive polymer layer or may occur after the application of the entire coating. In some embodiments, the conductive polymer can be healed by dipping the part into an electrolyte solution, and thereafter applying a constant voltage to the solution until the current is reduced to a preselected level. If desired, such healing can be accomplished in multiple steps. For example, an electrolyte solution can be a dilute solution of the monomer, the catalyst, and dopant in an alcohol solvent (e.g., ethanol). The coating may also be washed if desired to remove various byproducts, excess reagents, and so forth.

D. Additional Layers

Although not required, an external polymer coating may also be applied to the anode body and overlie the solid electrolyte. The external polymer coating generally contains one or more layers formed from a dispersion of pre-polymerized conductive particles, such as described in more detail above. The external coating may be able to further penetrate into the edge region of the capacitor body to increase the adhesion to the dielectric and result in a more mechanically robust part, which may reduce equivalent series resistance and leakage current. Because it is generally intended to improve the degree of edge coverage rather to impregnate the interior of the anode body, the particles used in the external coating typically have a larger size than those employed in any optional dispersions of the solid electrolyte. For example, the ratio of the average size of the particles employed in the external polymer coating to the average size of the particles employed in any dispersion of the solid electrolyte is typically from about 1.5 to about 30, in some embodiments from about 2 to about 20, and in some embodiments, from about 5 to about 15. For example, the particles employed in the dispersion of the external coating may have an average size of from about 50 nanometers to about 500 nanometers, in some embodiments from about 80 nanometers to about 250 nanometers, and in some embodiments, from about 100 nanometers to about 200 nanometers.

If desired, a crosslinking agent may also be employed in the external polymer coating to enhance the degree of adhesion to the solid electrolyte. Typically, the crosslinking agent is applied prior to application of the dispersion used in the external coating. Suitable crosslinking agents are described, for instance, in U.S. Patent Publication No. 2007/0064376 to Merker, et al. and include, for instance, amines (e.g., diamines, triamines, oligomer amines, polyamines, etc.); polyvalent metal cations, such as salts or compounds of Mg, Al, Ca, Fe, Cr, Mn, Ba, Ti, Co, Ni, Cu, Ru, Ce or Zn, phosphonium compounds, sulfonium compounds, etc. Particularly suitable examples include, for instance, 1,4-diaminocyclohexane, 1,4-bis(amino-methyl) cyclohexane, ethylenediamine, 1,6-hexanediamine, 1,7-heptanediamine, 1,8-octanediamine, 1,9-nonanediamine, 1,10-decanediamine, 1,12-dodecanediamine, N,N-dimethylethylenediamine, N,N,N',N'-tetramethylethylenediamine, N,N,N',N'-tetramethyl-1,4-butanediamine, etc., as well as mixtures thereof.

The crosslinking agent may be typically applied from a solution or dispersion whose pH is from 1 to 10, in some embodiments from 2 to 7, in some embodiments, from 3 to 6, as determined at 25° C. Acidic compounds may be employed to help achieve the desired pH level. Examples of solvents or dispersants for the crosslinking agent include water or organic solvents, such as alcohols, ketones, carboxylic esters, etc. The crosslinking agent may be applied to the capacitor body by any known process, such as spin-coating, impregnation, casting, dropwise application, spray application, vapor deposition, sputtering, sublimation, knife-coating, painting or printing, for example inkjet, screen or pad printing. Once applied, the crosslinking agent may be dried prior to application of the polymer dispersion. This process may then be repeated until the desired thickness is achieved. For example, the total thickness of the entire external polymer coating, including the crosslinking agent and dispersion layers, may range from about 1 micrometer to about 50 micrometers, in some embodiments from about 2 micrometers to about 40 micrometers, and in some embodiments, from about 5 micrometers to about 20 micrometers.

If desired, the capacitor may also contain other layers. For example, a protective coating may optionally be formed between the dielectric and solid electrolyte, such as one made of a relatively insulative resinous material (natural or synthetic). Such materials may have a specific resistivity of greater than about $10\Omega \cdot cm$, in some embodiments greater than about 100, in some embodiments greater than about 1,000Ω·cm, in some embodiments greater than about $1\times10^5$ Ω·cm, and in some embodiments, greater than about $1\times10^{10}$ Ω·cm. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al., which is incorporated herein in its entirety by reference thereto for all purposes.

If desired, the part may also be applied with a carbon layer (e.g., graphite) and silver layer, respectively. The silver coating may, for instance, act as a solderable conductor, contact layer, and/or charge collector for the capacitor and the carbon coating may limit contact of the silver coating with the solid electrolyte. Such coatings may cover some or all of the solid electrolyte.

II. Anode Lead Assembly

As discussed above, the electrolytic capacitor of the present invention can include an anode assembly that can include at least a first anode lead, a second anode lead, and a carrier wire, although it is to be understood that any suitable number of anode leads and carrier wires can be utilized. The first anode lead, the second anode lead, and any additional anode leads can have an embedded portion that is embedded within the porous anode body and an external portion that extends from a surface thereof in a longitudinal direction. Further, the at least one carrier wire is not embedded within the porous anode body and can have a first portion that is connected to the external portion of the first anode lead, the second anode lead, and any additional lead, while a second portion of the carrier wire extends longitudinally away from the surface of the sintered, porous anode body in the x-direction. The first anode lead, the second anode lead, any additional anode leads, the carrier wire, and any additional carrier wires may be formed from any electrically conductive material, such as tantalum, niobium, nickel, aluminum, hafnium, titanium, stainless steel, etc., as well as alloys, oxides, and/or nitrides of thereof. In one embodiment, the anode leads and the carrier wire can be tantalum. In another embodiment, the first anode lead and the second anode lead can be tantalum while the carrier wire can be stainless steel, nickel or an alloy thereof, copper or an alloy thereof, brass, tin brass, nickel silvers, bronze, phosphor bronze, cupro nickel, cartridge brass and any derivatives thereof which can help reduce the cost of the anode lead assembly. In one particular embodiment, the carrier wire can be formed of NILO®, which is a nickel-iron alloy.

In addition, the first and second anode leads may possess any desired cross-sectional shape, such as circular, elliptical, square, rectangular, triangular, trapezoidal, standard oval, racetrack oval, etc., or a combination thereof. In some embodiments, the first anode lead and the second anode lead can be circular, where the first anode lead and the second lead (and any other additional anode leads) can have a width or diameter in the x-direction $W_1$ and $W_2$, respectively, (or height in the z-direction, not shown), ranging from about 200 micrometers to about 800 micrometers, such as from about 300 micrometers to about 700 micrometers, such as from about 400 micrometers to about 600 micrometers. Further, the embedded portion of the first anode lead and the second anode lead can be spaced apart by a gap or width $W_3$ in the x-direction, where the gap $W_3$ can range from about 25 micrometers to about 400 micrometers, such as from about 50 micrometers to about 300 micrometers, such as from about 100 micrometers to about 250 micrometers (see FIGS. 1-5).

In other embodiments, while the majority of the length of the first anode lead, the second anode lead, and the carrier wire can be circular having the dimensions described above, a part of the embedded portion of the first anode lead and/or a part of the embedded portion of the second anode lead (e.g., an end portion of the first anode lead and the second anode lead) can have an oval or rectangular shape due to flattening, crimping, compressing or otherwise altering the shape the embedded portion of the first anode lead and/or the embedded portion of the second anode lead with, for instance, a crimping or pinching device, such that the flattened, crimped, compressed, etc. portions can have a thickness or diameter in the x-direction that is larger than the remainder of the embedded portion of the first anode lead and the embedded portion of the second anode lead. Such flattening, crimping, compressing, etc. can reduce the DCL of the resulting capacitor. Further, although not required, such flattening, crimping, compressing, etc. can be carried out to such an extent that the parts of the embedded portion of the first anode lead and the embedded portion of the second anode lead that have been flattened, crimped, compressed, etc. are in contact with each other, so that no gap exists between the flattened, crimped, compressed, etc. portions (see FIGS. 11-17). In other embodiments, a gap exists between such flattened, crimped, compressed, etc. parts of the embedded portion of the first anode lead and the embedded portion of the second anode lead, where the gap or width $W_3$ can be decreased so that it ranges from about 0.5 micrometers to about 200 micrometers, such as from about 1 micrometer to about 150 micrometers, such as from about 5 micrometers to about 125 micrometers (see FIGS. 6-10).

In addition, a part of the external portion of the first anode lead and/or a part of the external portion of the second anode lead can have an oval or rectangular shape due to flattening, crimping, compressing, or otherwise altering the shape of the external portion of the first anode lead and/or the external portion of the second anode lead to connect the first anode lead and the second anode lead to the carrier wire, a portion of which can also have an oval or rectangular shape due to flattening, crimping, compressing, or otherwise altering the shape of the carrier wire when the carrier wire is connected to the external portion of the first anode lead and the external portion of the second anode lead by resistance welding, laser welding, or any other suitable method.

Further, the one or more carrier wires can be circular and can have a width or diameter in the x-direction $W_4$ (or height in the z-direction, not shown) ranging from about 50 micrometers to about 300 micrometers, such as from about 75 micrometers to about 250 micrometers, such as from about 100 micrometers to about 200 micrometers. Generally, to reduce the ESR of the resulting capacitor, the ratio of the width/diameter of the first or second anode leads to the width/diameter of the carrier wire can range from about 1.1 to about 5, such as from about 1.25 to about 4, such as from about 1.5 to about 3. Moreover, at least a part of the first portion of the carrier wire (e.g., the portion that is connected to the external portions of the first anode lead, the second anode lead, and any additional anode lead) can be flattened, crimped, compressed, or otherwise altered due to the formation of the connection between the anode leads and the carrier wire due to resistance welding, laser welding, or any other suitable method.

As a result of the anode lead/carrier wire configurations described above, the bond between the embedded portions of the first anode lead, the second anode lead, and any additional anode leads and the particles of the anode body can be improved due to the larger width/diameters of the first anode lead, the second anode lead, and any additional anode leads, resulting in a lower ESR. Meanwhile, because the carrier wire or wires have a smaller width/diameter than the embedded portions of the anode leads, the energy required to electrically connect the anode body to the anode termination is significantly reduced. Thus, the combination of the larger diameter anode leads and the smaller diameter carrier wire or wires can synergistically reduce the ESR and the DCL of the resulting capacitor. In addition, while the external portions of the first anode lead and the second anode lead can have the same or larger width/diameter of the embedded portions of the first anode lead and the second anode lead, the external portions can extend only a small distance from a surface of the anode body to minimize the length of the external portions of the first anode lead and the second anode lead, which, in turn, can minimize the ESR. For instance, the external portions of the first anode lead and the second anode lead can have a length $L_2$ in the z-direction ranging from about 50 micrometers to about 1250 micrometers, such as from about 100 micrometers to about 1000 micrometers, such as from about 250 micrometers to about 750 micrometers. On the other hand, the carrier wire or wires, which can be used to form an electrical connection with an anode termination, can have a smaller diameter than that of the anode leads, which can reduce the internal resistance of the carrier wire or wires to minimize the ESR of the anode lead assembly extending from/external to the porous anode body.

Various embodiments of the capacitor contemplated by the present invention are discussed in more detail below. FIGS. 1-5 show capacitors utilizing a first anode lead, a second anode lead, and a carrier wire, or a first anode lead, a second anode lead, a third anode lead, a first carrier wire, and a second carrier wire, where the embedded portions of the anode leads have a uniform diameter so that a gap exists between the embedded portions of the anode leads. Meanwhile, FIGS. 6-10 show capacitors utilizing a first anode lead, a second anode lead, and a carrier wire, or a first anode lead, a second anode lead, a third anode lead, a first carrier wire, and a second carrier wire, where the embedded portions of the anode leads have been flattened, crimped, compressed, etc. so that a smaller gap than the gap present in FIGS. 1-5 exists between the embedded portions of the anode leads. On the other hand, FIGS. 11-17 show capacitors utilizing a first anode lead, a second anode lead, and a carrier wire, or a first anode lead, a second anode lead, a third anode lead, a first carrier wire, and a second carrier wire, where the embedded portions of the anode leads have been flattened, crimped, compressed, etc. so that the flattened, crimped, compressed, etc. portions of the first anode lead and the second anode lead are in contact and the flattened, crimped, compressed, etc. portions of the second anode lead and the third anode lead are in contact (i.e., no gap exists between the embedded portions of the anode leads).

Figure 18:
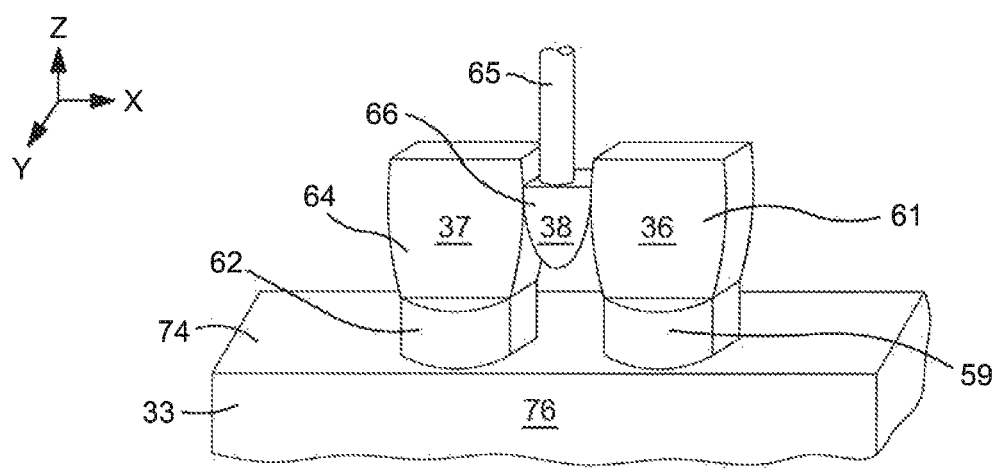
FIG. 18 is a top perspective view of one embodiment of an electrolytic capacitor of the present invention.

Turning first to FIG. 1, a capacitor 100 is shown that includes a capacitor element that includes a porous anode body 33, a dielectric (not shown), a cathode (not shown), a first anode lead 59, a second anode lead 62, and a carrier wire 65. The first anode lead 59 includes an embedded portion 60 that is embedded within the porous anode body 33 and an external portion 61 that extends from the porous anode body 33 in a longitudinal or z-direction, while the second anode lead 62 includes an embedded portion 63 that is embedded within the porous anode body 33 and an external portion 64 that extends from the porous anode body 33 in a longitudinal or z-direction. The embedded portion 60 of the first anode lead 59 has a generally uniform width or diameter $W_1$ and the embedded portion 63 of the second anode lead 62 has a generally uniform width or diameter $W_2$ such that a gap $W_3$ exists between the embedded portion 60 of the first anode lead 59 and the embedded portion 63 of the second anode lead 62. The external portion 61 of the first anode lead 59 and the external portion 64 of the second anode lead 62 are connected to a first portion 66 of the carrier wire 65, where the carrier wire 65 has a width $W_4$ and extends away from the porous anode body 33 in the longitudinal or z-direction. Specifically, the first portion 66 of the carrier wire 65 is positioned between the external portion 61 of the first anode lead 59 and the external portion 64 of the second anode lead 62. Further, although not required, the external portion 61 of the first anode lead 59, the external portion 64 of the second anode lead 62, and the first portion 66 of the carrier wire 65 can be flattened, crimped, compressed, etc. by resistance welding or any other suitable method to form the connection. Referring to FIG. 18, as a result, the external portion 61 of the first anode lead 59 can have flattened surface 36, the external portion 64 of the second anode lead 62 can have a flattened surface 37, and the first portion 66 of the carrier wire 65 can have a flattened surface 38, where the first portion 66 of the carrier wire 65 is positioned between and connected to the external portion 61 of the first anode lead 59 and the external portion 64 of the second anode lead 62. The carrier wire 65 also includes a second portion 67 that is electrically connected to an upstanding portion 42 of an anode termination 35 at a slot 43 and extends past the upstanding portion 42 of the anode termination 35, although the carrier wire 65 can be trimmed at the upstanding portion 42 of the anode termination 35 before assembling the capacitor inside a casing (not shown). The various features of the anode termination 35, the cathode termination 44, and the casing are discussed in more detail below.

Figure 2:
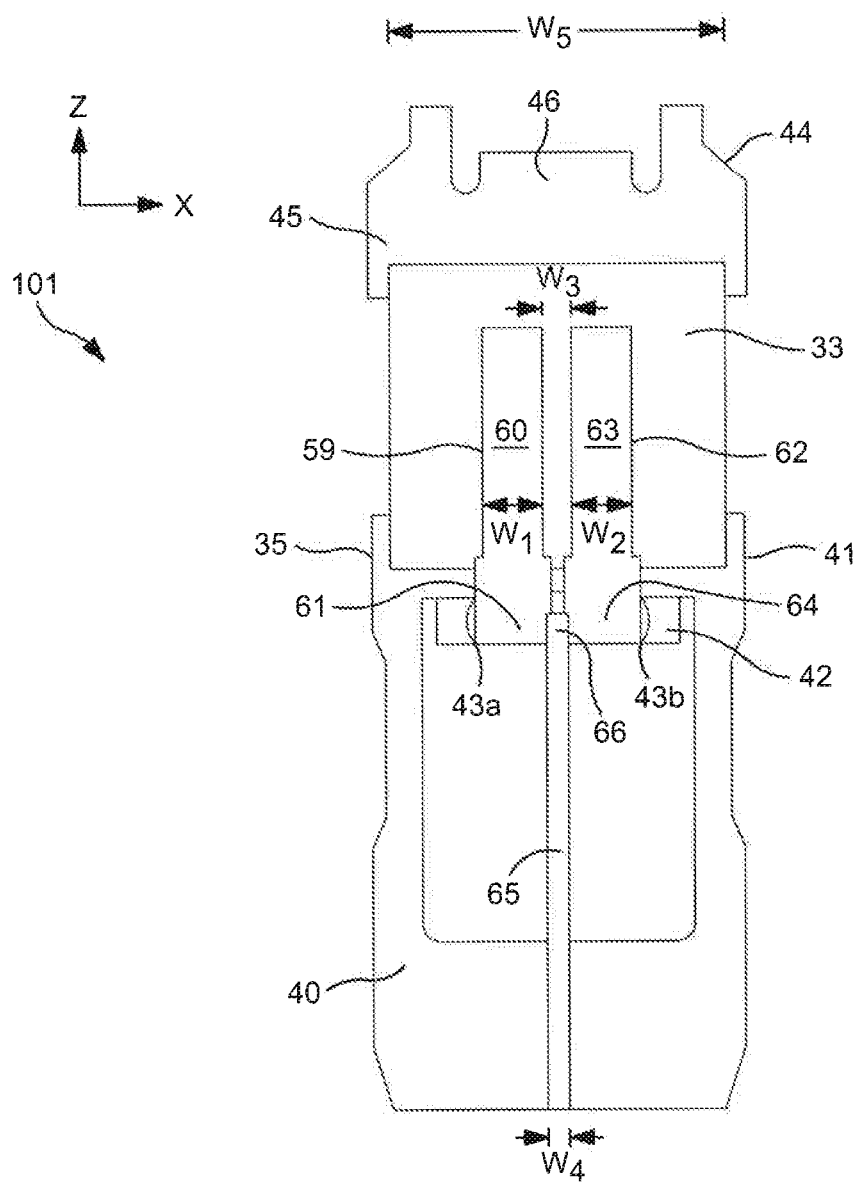
FIG. 2 is a top view of another embodiment of an electrolytic capacitor of the present invention.

In another embodiment, as shown in FIG. 2, the present invention contemplates a capacitor 101 where the external portion 61 of the first anode lead 59 and the external portion 64 of the second anode lead 62 can be electrically connected to the upstanding portion 42 of the anode termination at slots 43a and 43b, respectively, rather than the first portion 66 of the carrier wire 65 being electrically connected to an upstanding portion 42 of the anode termination 35 at slot 43 as in the capacitor 100 of FIG. 1.

Figure 3:
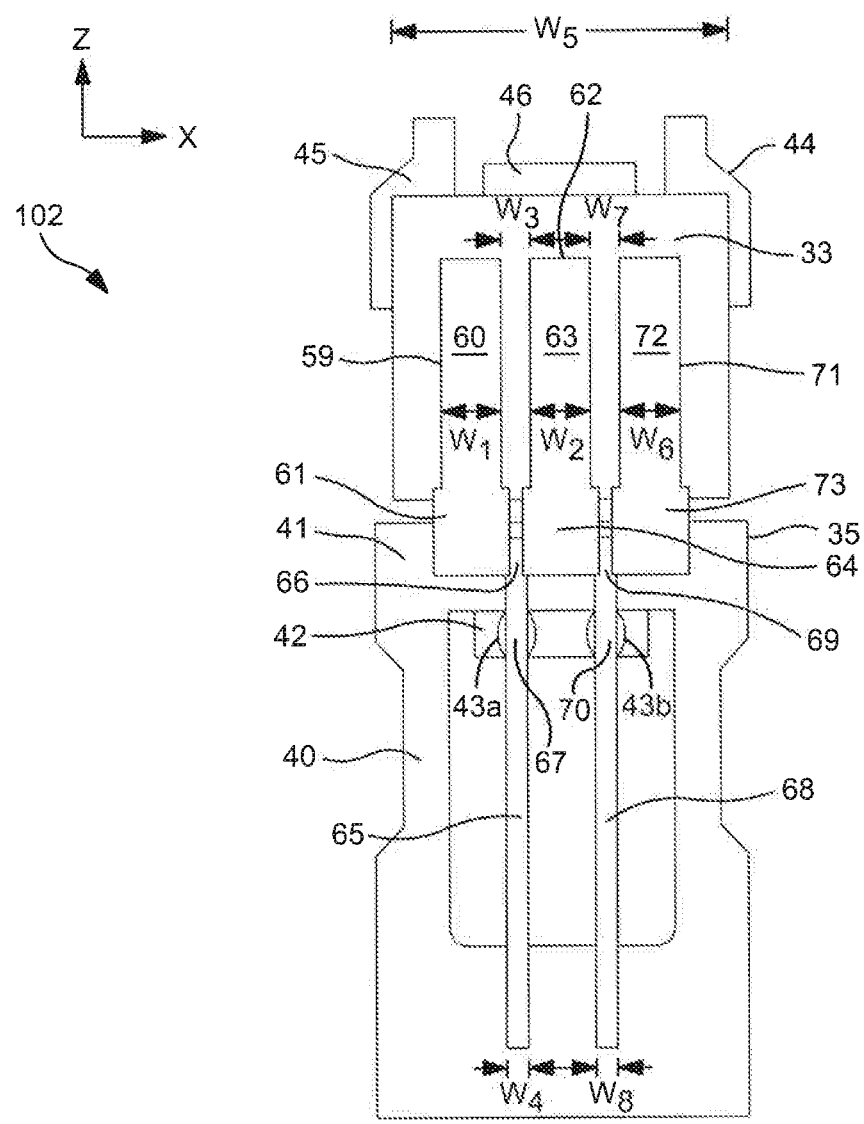
FIG. 3 is a top view of an additional embodiment of an electrolytic capacitor of the present invention.

Referring to FIG. 3, in an additional embodiment, a capacitor 102 is shown that includes a capacitor element that includes a porous anode body 33, a dielectric (not shown), a cathode (not shown), a first anode lead 59, a second anode lead 62, a third anode lead 71, a first carrier wire 65, and a second carrier wire 68. The first anode lead 59 includes an embedded portion 60 that is embedded within the porous anode body 33 and an external portion 61 that extends from the porous anode body 33 in a longitudinal or z-direction, the second anode lead 62 includes an embedded portion 63 that is embedded within the porous anode body 33 and an external portion 64 that extends from the porous anode body in a longitudinal or z-direction, and the third anode lead 71 includes an embedded portion 72 that is embedded within the porous anode body 33 and an external portion 73 that extends from the porous anode body 33 in a longitudinal or z-direction. The embedded portion 60 of the first anode lead 59 has a generally uniform width or diameter $W_1$ and the embedded portion 63 of the second anode lead 62 has a generally uniform width or diameter $W_2$ such that a gap $W_3$ exists between the embedded portion 60 of the first anode lead 59 and the embedded portion 63 of the second anode lead 62. Further, the embedded portion 72 of the third anode lead 71 has a generally uniform width or diameter $W_6$ such that a gap $W_7$ exists between the embedded portion 63 of the second anode lead 62 and the embedded portion 72 of the third anode lead 71. In addition, the external portion 61 of the first anode lead 59 and the external portion 64 of the second anode lead 62 are connected to a first portion 66 of the first carrier wire 65, where the first carrier wire 65 has a width $W_4$ and extends away from the porous anode body 33 in the longitudinal or z-direction. Specifically, the first portion 66 of the first carrier wire 65 is positioned between the external portion 61 of the first anode lead 59 and the external portion 64 of the second anode lead 62. In addition, the external portion 64 of the second anode lead 62 and the external portion 73 of the third anode lead 71 are connected to a first portion 69 of a the second carrier wire 68, where the second carrier wire 68 has a width $W_8$ and extends away from the porous anode body 33 in the longitudinal or z-direction. Specifically, the first portion 69 of the second carrier wire 68 is positioned between the external portion 64 of the second anode lead 62 and the external portion 73 of the third anode lead 71. Further, although not required, the external portion 61 of the first anode lead 59, the external portion 64 of the second anode lead 62, the external portion 73 of the third anode lead 71, the first portion 66 of the first carrier wire 65 and the first portion 69 of the second carrier wire 68 can be flattened, crimped, compressed, etc. by resistance welding or any other suitable method to form the connection. The first carrier wire 65 also includes a second portion 67 that is electrically connected to an upstanding portion 42 of an anode termination 35 at a slot 43a and extends past the upstanding portion 42 of the anode termination 35, while the second carrier wire 68 also includes a second portion 70 that is electrically connected to an upstanding portion 42 of the anode termination 35 at a slot 43b and extends past the upstanding portion 42b, although the first carrier wire 65 and the second carrier wire 68 can be trimmed at the upstanding portion 42 of the anode termination 35 before assembling the capacitor inside a casing (not shown). It should be understood that the dimensions for $W_6$, $W_7$, and $W_8$ can be the same as those discussed above fore $W_1$, $W_2$, $W_3$, and $W_4$.

Figure 4:
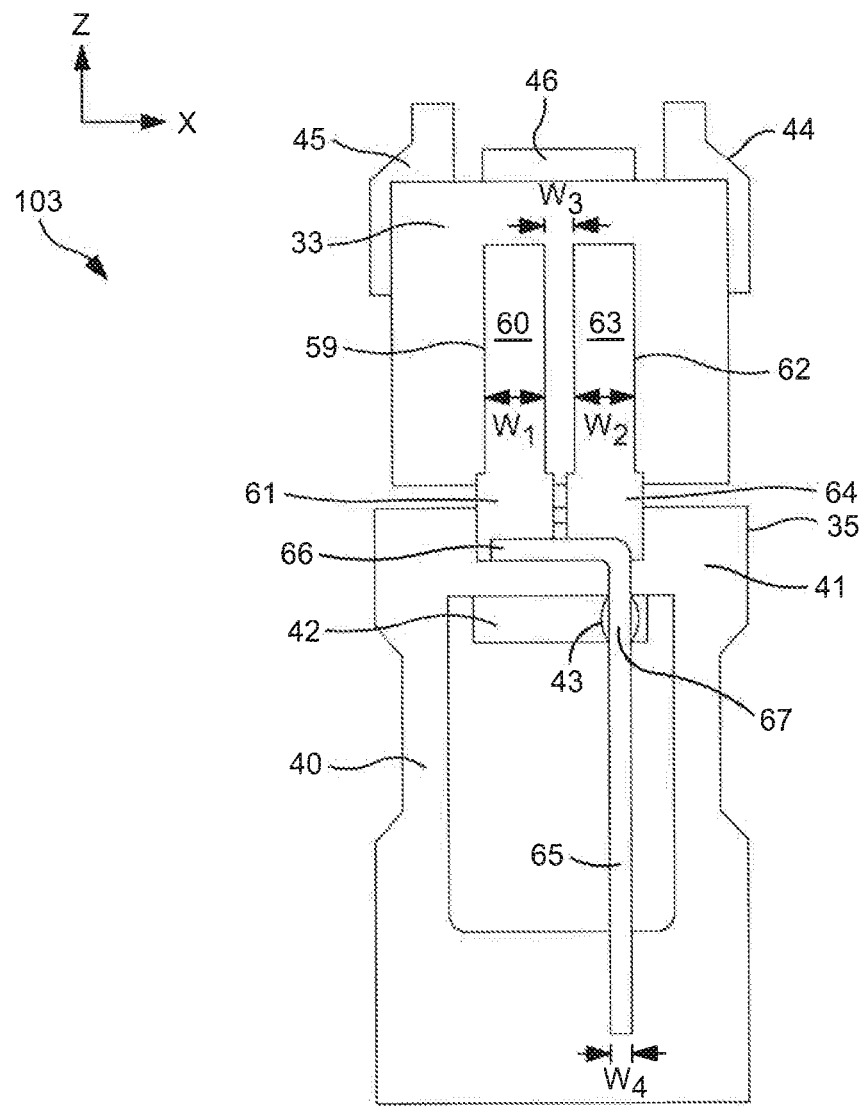
FIG. 4 is a top view of still another embodiment of an electrolytic capacitor of the present invention.

Next, in still another embodiment, as shown in FIG. 4, the present invention contemplates a capacitor 103 that is similar to the capacitor 100 of FIG. 1 except for the positioning of the first portion 66 of the carrier wire 65. Rather than the first portion 66 of the carrier wire 65 being positioned between the external portion 61 of the first anode lead 59 and the external portion 64 of the second anode lead 62 and extending away from the anode body in the longitudinal or z-direction as in FIG. 1, in FIG. 4, the first portion 66 of the carrier wire 65 in the capacitor 103 is positioned generally perpendicular to the longitudinal or z-direction and extends across the width $W_1$ of the external portion 61 of the first anode lead 59 and the width $W_3$ of the external portion 64 of the second anode lead 62 in the transverse or x-direction.

Figure 5:
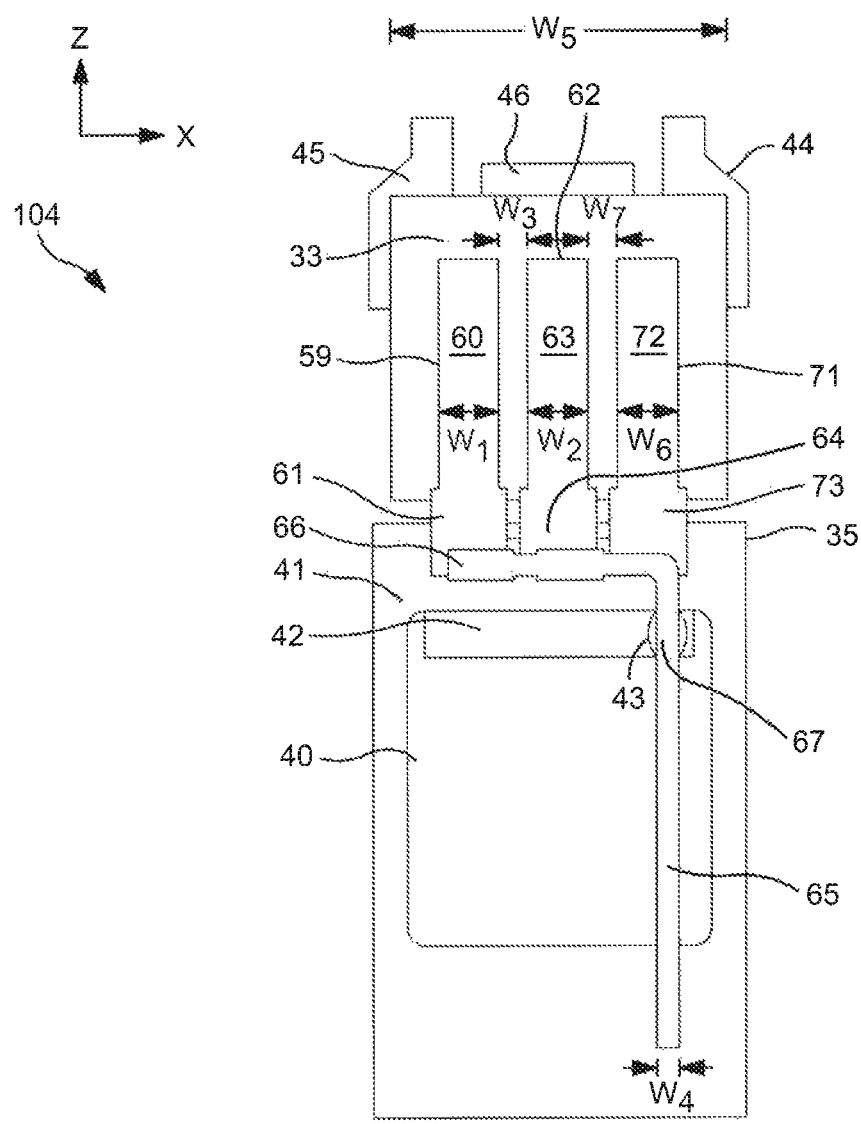
FIG. 5 is a top view of yet another embodiment of an electrolytic capacitor of the present invention.
Figure 6:
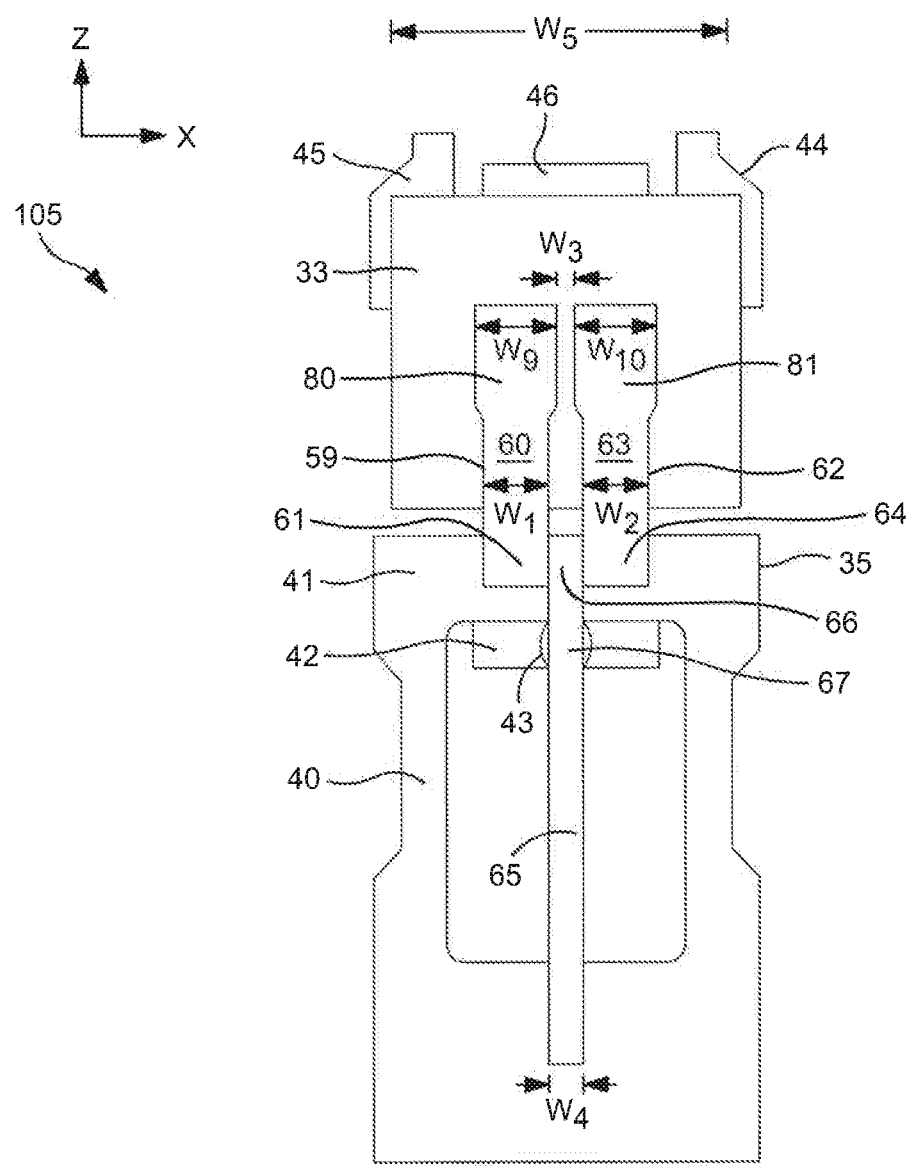
FIG. 6 is a top view of one more embodiment of an electrolytic capacitor of the present invention.
Figure 7:
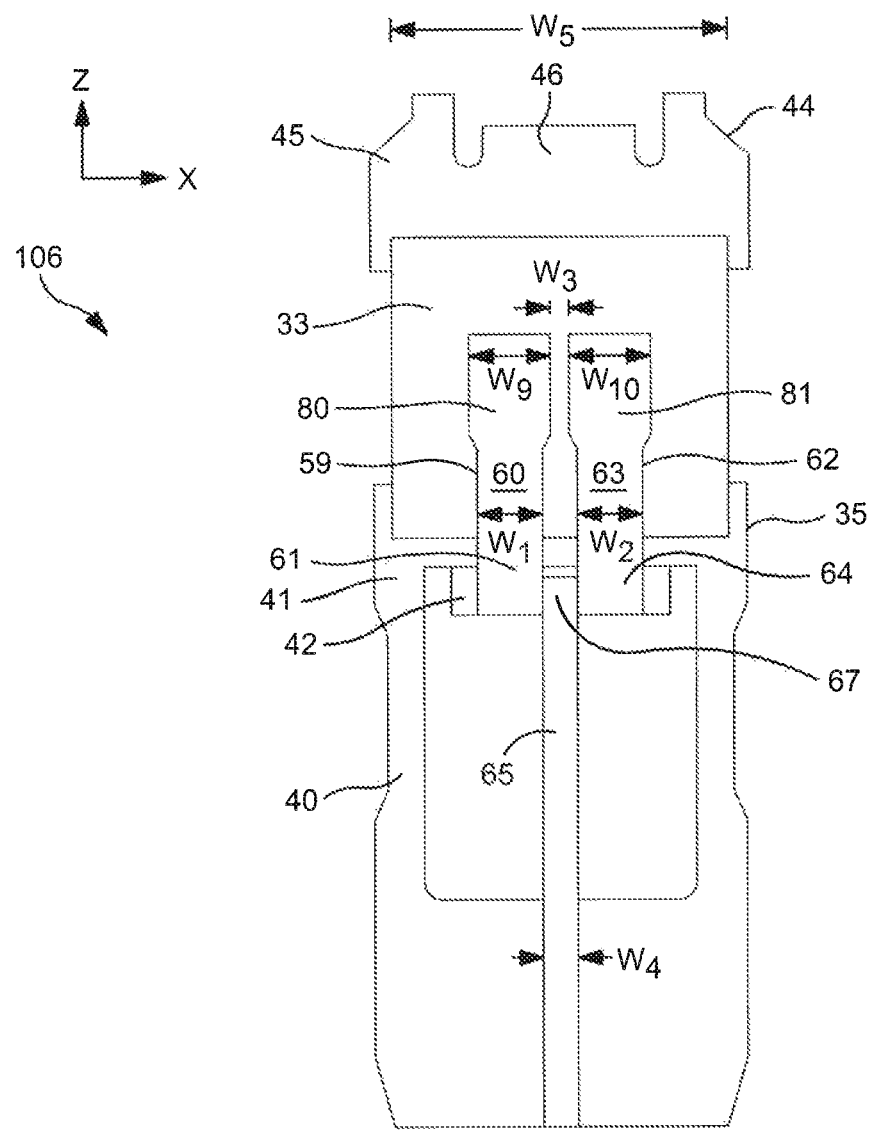
FIG. 7 is a top view of a further embodiment of an electrolytic capacitor of the present invention.
Figure 8:
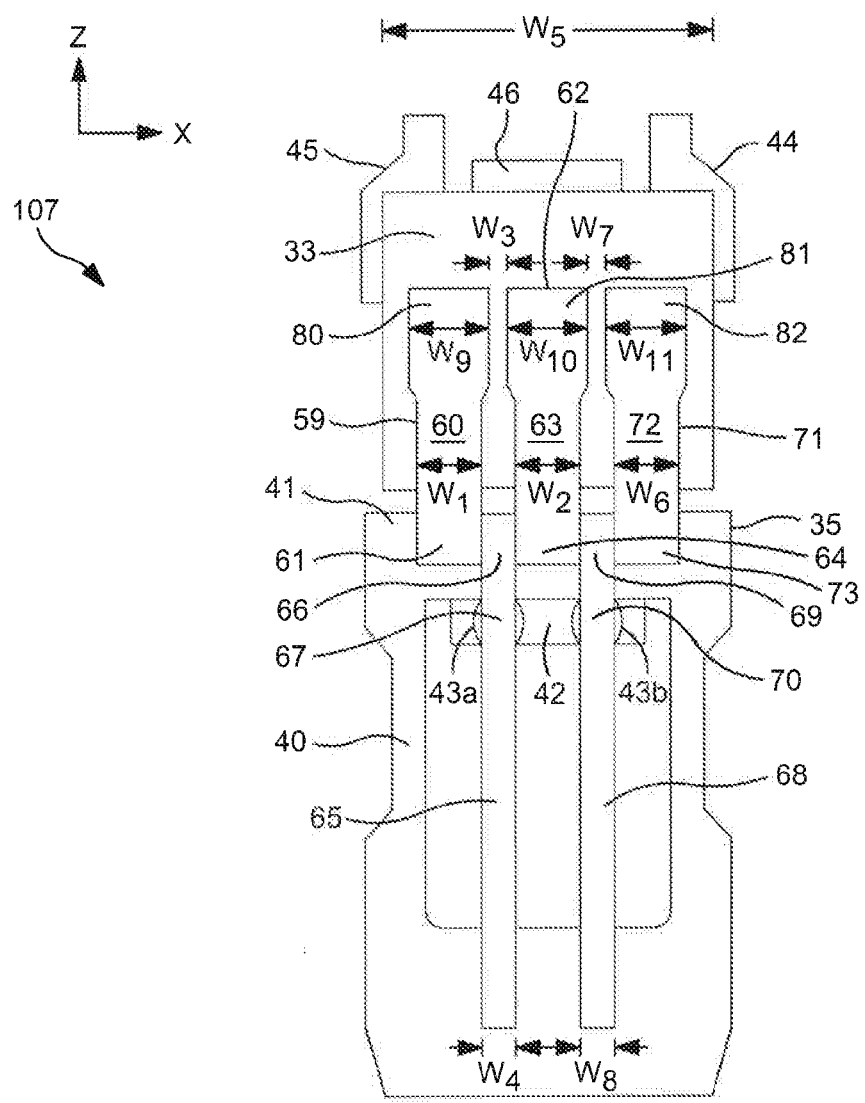
FIG. 8 is a top view of another embodiment of an electrolytic capacitor of the present invention.
Figure 9:
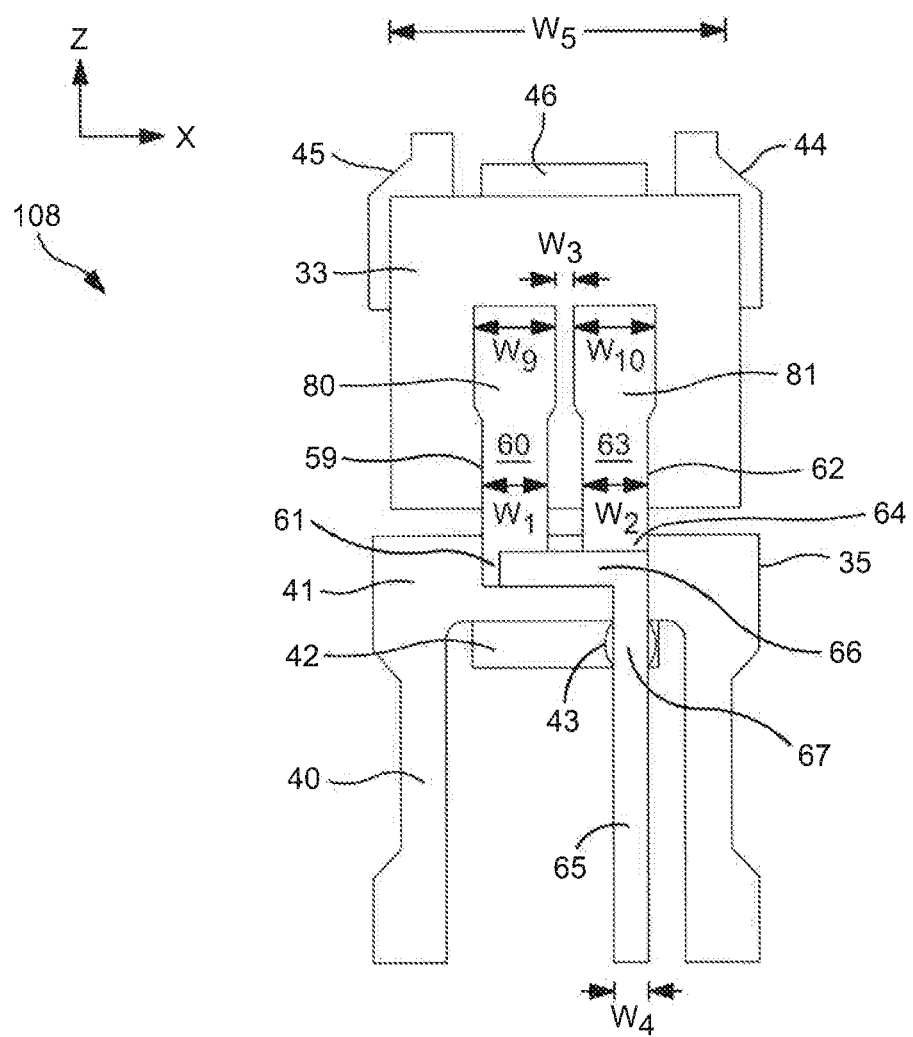
FIG. 9 is a top view of an additional embodiment of an electrolytic capacitor of the present invention.
Figure 10:
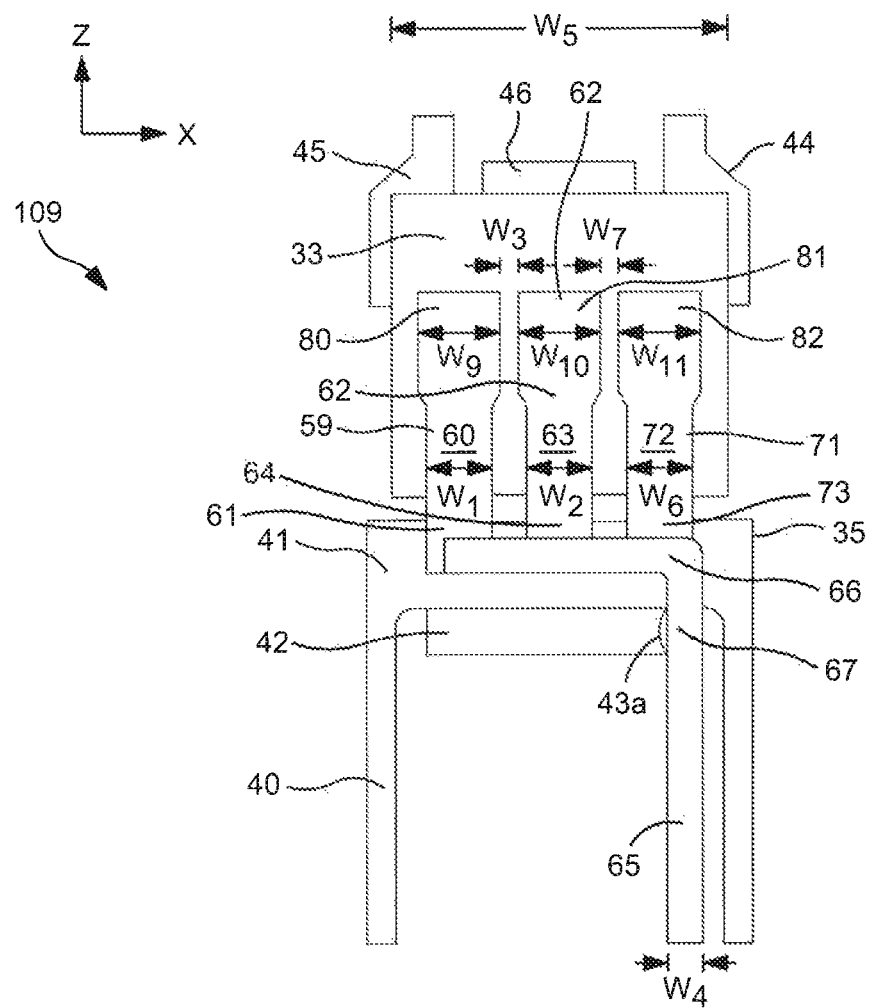
FIG. 10 is a top view of still another embodiment of an electrolytic capacitor of the present invention.
Figure 11:
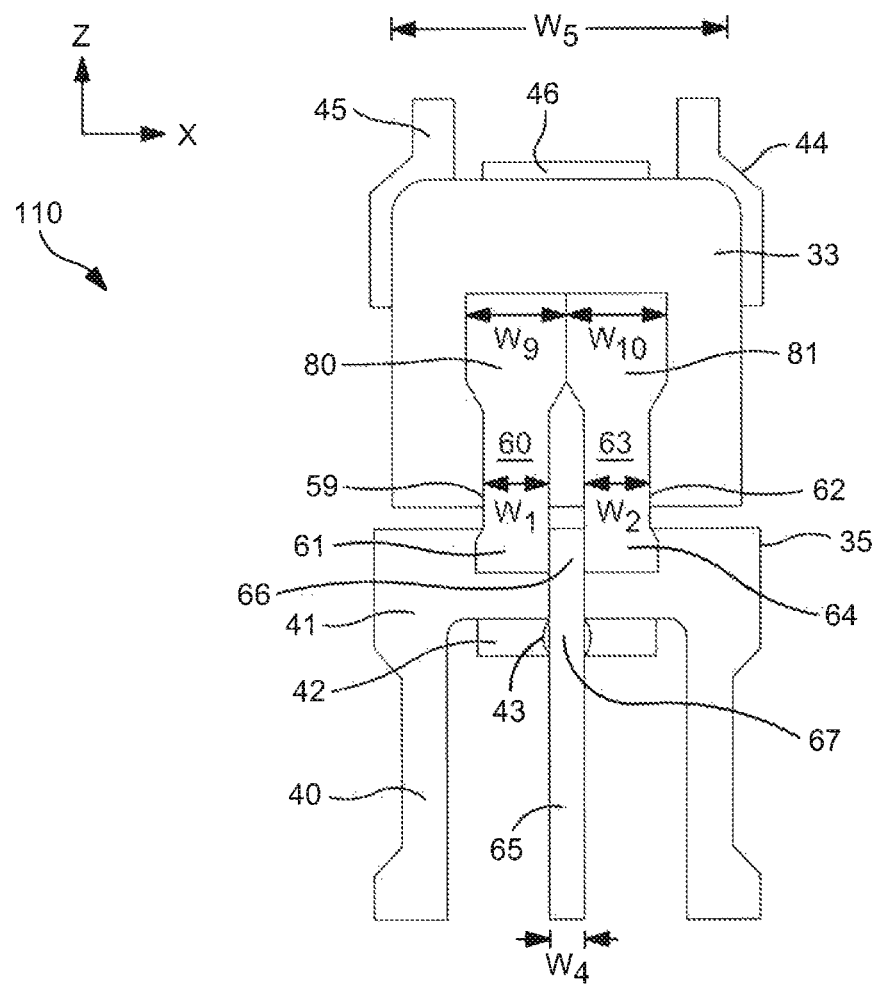
FIG. 11 is a top view of yet another embodiment of an electrolytic capacitor of the present invention.
Figure 12:
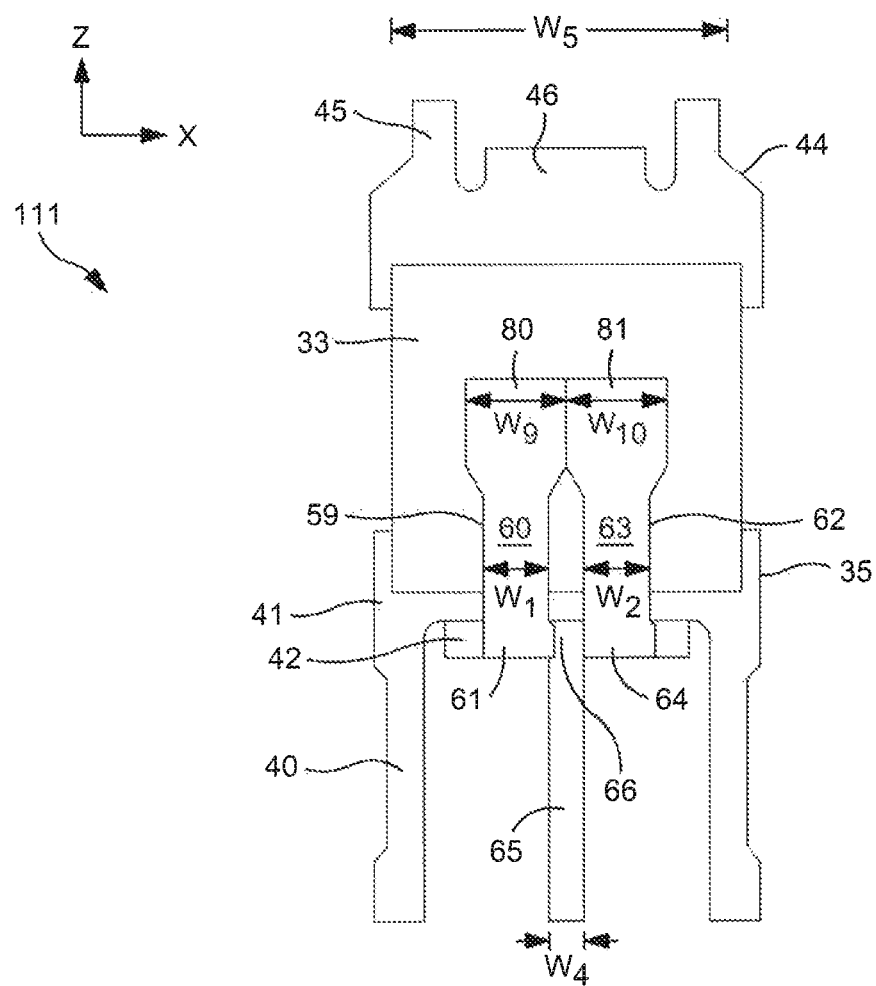
FIG. 12 is a top view of one more embodiment of an electrolytic capacitor of the present invention.
Figure 13:
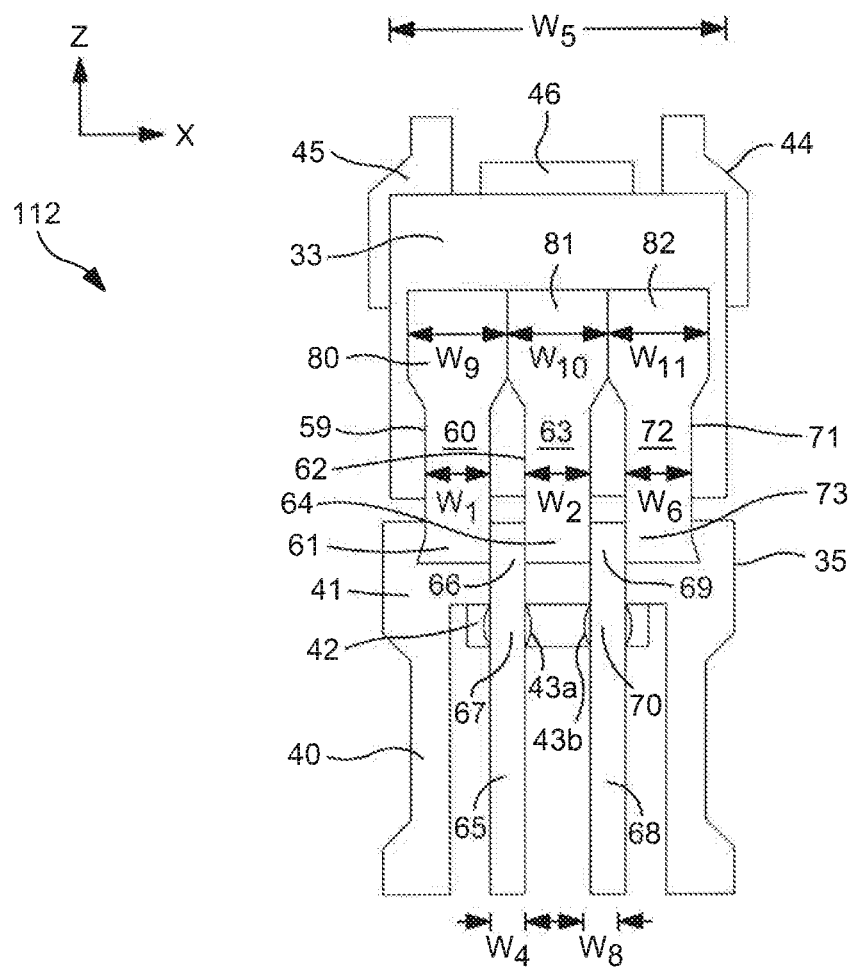
FIG. 13 is a top view of another embodiment of an electrolytic capacitor of the present invention.

In yet another embodiment, as shown in FIG. 5, the present invention contemplates a capacitor 104 that is similar to the capacitor 102 of FIG. 3 except rather than utilizing a single carrier wire 65 and as a second carrier wire 68, only a first carrier wire 65 is utilized to form a connection between the three anode leads and the upstanding portion 42 of the anode termination 35. In order to utilize a single carrier wire 65 to connect the external portion 61 of the first anode lead 59, the external portion 64 of the second anode lead 62, and the external portion 73 of the third anode lead 71, the first portion 66 of the carrier wire 65 is positioned generally perpendicular to the longitudinal or z-direction and extends across the width $W_1$ of the external portion 61 of the first anode lead 59, the width $W_3$ of the external portion 64 of the second anode lead 62, and the width $W_6$ of the external portion 73 of the third anode lead 71 in the transverse or x-direction. A second portion 67 of the carrier wire 65 is then connected to an upstanding portion 42 of the anode termination 35 at slot 43.

Referring now to FIGS. 6-10, capacitors 105, 106, 107, 108, and 109 are shown, which are similar to capacitors 100, 101, 102, 103, and 104, respectively, except that the embedded portions of the anode leads are flattened, crimped, compressed, or otherwise altered such that the flattened, crimped, compressed, etc. portions can have a thickness or diameter in the x-direction that is larger than the remainder of the embedded portions of the first anode lead, the second anode lead, and the third anode lead, resulting in a smaller gap $W_3$ between the flattened, crimped, compressed, etc. embedded portions 80 and 81 of the first anode lead 59 and the second anode lead 62, respectively and a smaller gap $W_7$ between the flattened, crimped, compressed, etc. embedded portions 81 and 82 of the second anode lead 62 and the third anode lead 71, respectively, as compared to gaps $W_3$ and $W_7$ of FIGS. 1-5. Further, as a result of the flattening, crimping, compressing, etc. of the embedded portion 80 of the first anode lead 59, the embedded portion 81 of the second anode lead 62, and the embedded portion 82 of the third anode lead 71, the flattened embedded portion 80 of the first anode lead 59, the flattened embedded portion 81 of the second anode lead 62, and the flattened embedded portion 82 of the third anode lead 71 can have widths $W_9$, $W_{10}$, and $W_{11}$, respectively, that are increased compared to the widths $W_1$, $W_2$, and $W_6$ of the embedded portions 60, 63, and 72 of the first anode lead 59, second anode lead 62, and third anode lead 71, respectively.

Turning to FIGS. 11-15, capacitors 110, 111, 112, 113, and 114 are shown, which are similar to capacitors 100, 101, 102, 103, and 104, respectively, except that the embedded portions of the anode leads are flattened, crimped, compressed, or otherwise altered such that the flattened, crimped, compressed, etc. portions can have a thickness or diameter in the x-direction that is larger than the remainder of the embedded portions of the first anode lead, the second anode lead, and the third anode lead, such that no gap exists between the flattened, crimped, compressed, etc. embedded portions 80 and 81 of the first anode lead 59 and the second anode lead 62, respectively and no gap exists between the flattened, crimped, compressed, etc. embedded portions 81 and 82 of the second anode lead 62 and the third anode lead 71, respectively, such that the embedded portions 80 and 81 of the first anode lead 50 and the second anode lead 62 are in contact and connected, and the embedded portions 81 and 82 of the second anode lead 62 and the third anode lead 71 are in contact and connected. Further, as a result of the flattening, crimping, compressing, etc. of the embedded portion 80 of the first anode lead 59, the embedded portion 81 of the second anode lead 62, and the embedded portion 82 of the third anode lead 71, the flattened embedded portion 80 of the first anode lead 59, the flattened embedded portion 81 of the second anode lead 62, and the flattened embedded portion 82 of the third anode lead 71 can have widths $W_9$, $W_{10}$, and $W_{11}$, respectively, that are increased compared to the widths $W_1$, $W_2$, and $W_6$ of the embedded portions 60, 63, and 72 of the first anode lead 59, second anode lead 62, and third anode lead 71, respectively.

Figure 14:
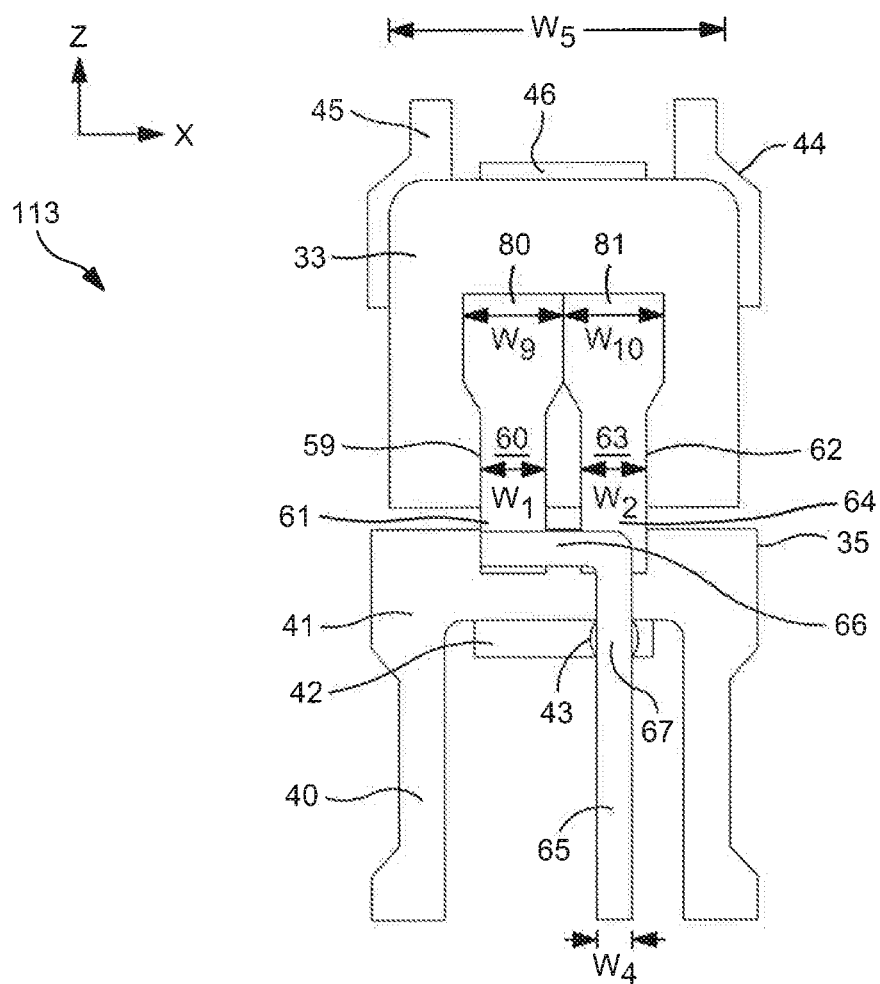
FIG. 14 is a top view of an additional embodiment of an electrolytic capacitor of the present invention.
Figure 15:
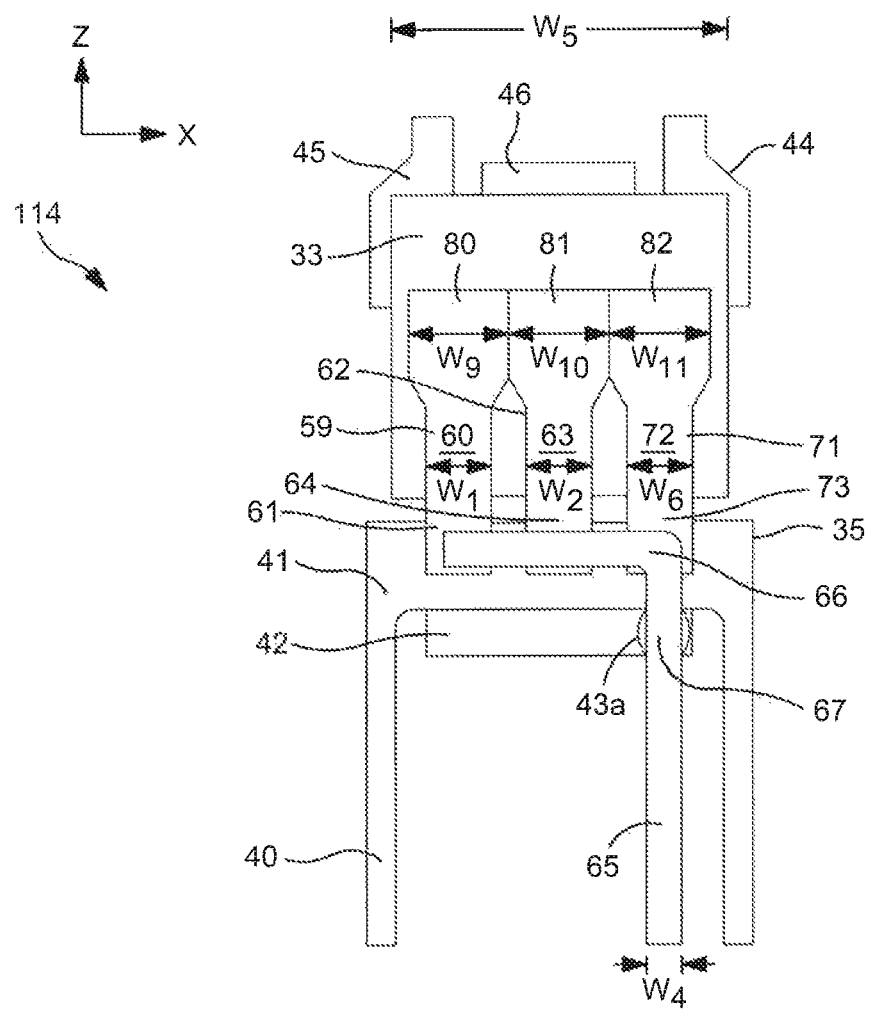
FIG. 15 is a top view of still another embodiment of an electrolytic capacitor of the present invention.
Figure 16:
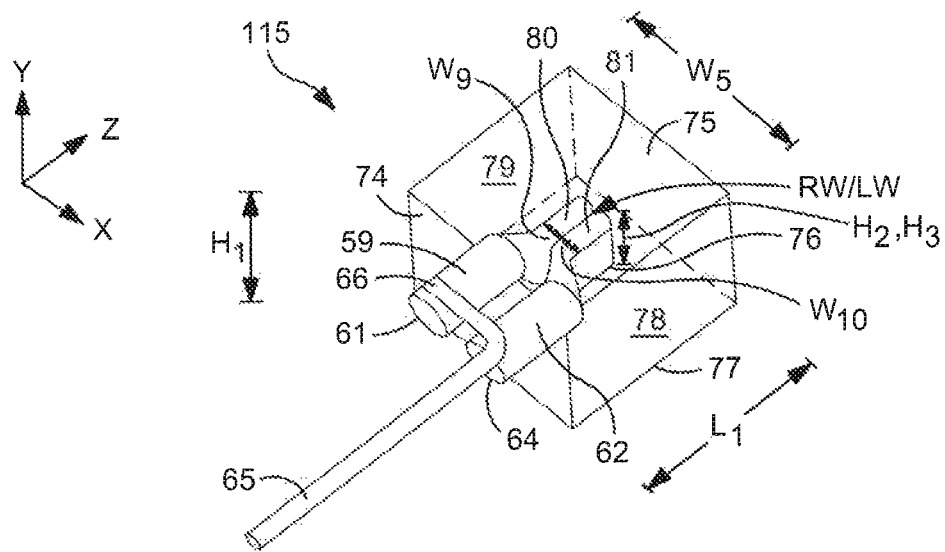
FIG. 16 is a perspective view of one embodiment of an electrolytic capacitor of the present invention.
Figure 17:
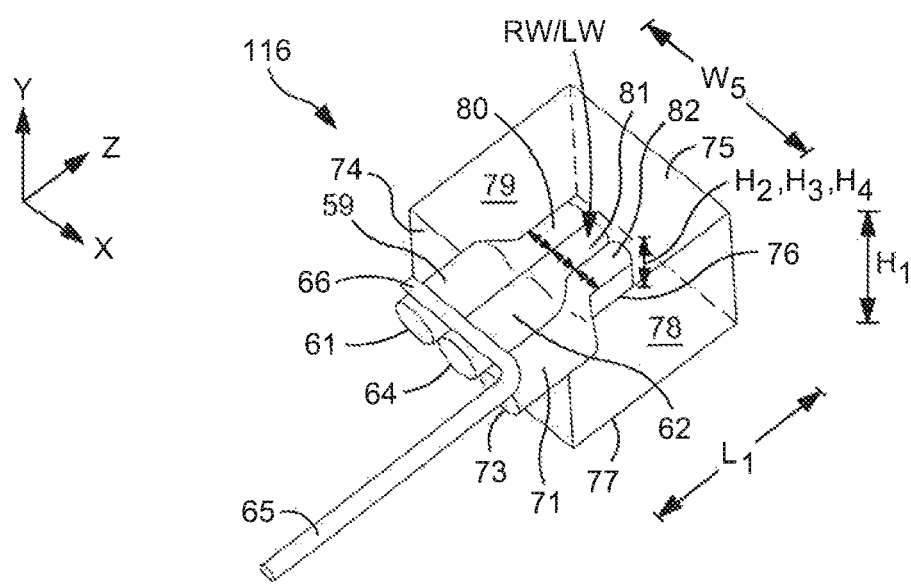
FIG. 17 is a perspective view of another embodiment of an electrolytic capacitor of the present invention.

Next, FIGS. 16-17 show alternative arrangements for the anode leads in FIGS. 14-15, respectively. For instance, in FIG. 16, instead of the flattened embedded portion 80 of the first anode lead 59 and the flattened embedded portion 81 of the second anode lead 62 being resistance welded (RW) and/or laser welded (LW) so that the width $W_9$ and $W_{10}$ of the flattened embedded portions 80 and 81 is increased in the transverse or x-direction as in FIG. 14, the resistance welding or laser welding is carried out such that the width $W_9$ and $W_{10}$ of the flattened embedded portions 80 and 81 is decreased and the height $H_2$ and $H_3$ of the embedded portions 80 and 81 is increased. Similarly, in FIG. 17, instead of the flattened embedded portion 80 of the first anode lead 59, the flattened embedded portion 81 of the second anode lead 62, and the flattened embedded portion 82 of the third anode lead 71 being resistance welded (RW) and/or laser welded (LW) so that the width $W_9$, $W_{10}$, and $W_{11}$ of the flattened embedded portions 80, 81, and 82 is increased in the transverse or x-direction as in FIG. 15, the resistance welding or laser welding is carried out such that the width $W_9$, $W_{10}$, and $W_{11}$ of the flattened embedded portions 80, 81, and 82 is decreased and the height $H_2$, $H_3$, and $H_4$ of the embedded portions 80, 81, and 82 is increased.

Regardless of the particular design or manner in which the capacitor of the present invention is formed, it can be connected to terminations as is well known in the art. For example, anode and cathode terminations may be electrically connected to the second anode lead and the cathode, respectively. The specific configuration of the terminations may vary as is well known in the art. Although not required, as shown in FIGS. 1-17, for example, the capacitor of the present invention can include a leadframe 40 that includes a cathode termination 44 and an anode termination 35. The cathode termination 44 can contain a planar portion 45 in electrical contact with a lower surface 77 of the capacitor element and an upstanding portion 46 positioned substantially perpendicular to the planar portion 45 and in electrical contact with a rear surface 75 of the capacitor element. To attach the capacitor element to the cathode termination, a conductive adhesive may be employed as is known in the art. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives are described in U.S. Patent Application Publication No. 2006/0038304 to Osaka, et al., which is incorporated herein in its entirety by reference thereto for all purposes.

Referring again to FIGS. 1-17, although not required, the anode termination 35 may likewise contain a planar portion 41 and an upstanding portion 42. The upstanding portion 42 may contain a region that carries a second portion 67 of the first carrier wire 65 of the present invention. For example, the region may possess a slot 43 for receiving the second portion 67 of the first carrier wire 65. Further, if two carrier wires are utilized, the upstanding portion 42 of the anode termination 35 may contain a region that carries a second portion 67 of the first carrier wire 65 and a region that carries a second portion 70 of the second carrier wire 68. Specifically, the region may possess a slot 43a for receiving the second portion 67 of the first carrier wire 65 and a slot 43b for receiving the second portion 70 of the second carrier wire 68. The slot or slots may have any desired shape, and can be U-shaped, V-shaped, circular, elliptical, oval, rectangular, square, stepped, etc. for further enhancing surface contact and mechanical stability of the second portion 72 of the second anode lead 70 at the anode termination 35. For instance, the geometry of the slots 43 and 43a can match the geometry of the second portion 67 of the first carrier wire 65 and the geometry of the slot 4b can match the geometry of the second portion 70 of the second carrier wire 68. The second portions 67 and 70 of the first carrier wire 65 and the second carrier wire 68 can be electrically connected to the anode termination 35 by any suitable technique, such as by laser welding, by resistance welding, or the use of conductive adhesives, etc.

Regardless of the particular welding technique used, the amount of energy required to form a sufficient weld is reduced when compared to the amount of energy that would be required if the larger diameter anode leads were directly connected to the anode termination. Thus, by utilizing a smaller diameter carrier wire or wires to serve as the direct connection to the anode termination, the benefit of embedding relatively thick anode leads in the porous anode body can still be realized (i.e., improved contact with the porous anode body to decrease the ESR), yet the welding process to form an electrical connection with an anode termination can be carried out in a more efficient and cost-effective manner due to the reduced thickness/height or diameter of the carrier wire or wires. Further, the reduced internal resistance of the carrier wires can further decrease the ESR.

Moreover, once the capacitor element is formed and is attached to the terminations as discussed above, and once the excess length, if any, of the carrier wire is trimmed, the capacitor element and anode lead assembly can be enclosed within a resin casing, which may then be filled with silica or any other known encapsulating material. The width and length of the case may vary depending on the intended application. However, the overall thickness of the casing is typically small so that the resultant assembly may be readily incorporated into low profile products (e.g., "IC cards"). For example, the thickness of the casing may range from about 5 millimeters or less, in some embodiments, from about 0.4 millimeters to about 4 millimeters, and in some embodiments, from about 0.6 millimeters micrometers to about 3 millimeters. Suitable casings may include, for instance, "A", "B", "H", or "T" cases (AVX Corporation). After encapsulation, exposed portions of the respective anode and cathode terminations may be aged, screened, and trimmed. If desired, the exposed portions may be optionally bent twice along the outside of the casing (e.g., at an approximately 90° angle).

As a result of the present disclosure, a capacitor may be formed that exhibits excellent electrical properties as determined by the test procedures described below. For example, the capacitor of the present invention can exhibit an ultralow ESR, such as about 300 milliohms (mΩ) or less, in some embodiments about 100 mΩ or less, in some embodiments from about 0.01 mΩ to about 50 mΩ, and in some embodiments, from about 0.1 mΩ to about 20 mΩ, determined at a frequency of 100 kHz and a temperature of 23° C.±2° C. In addition, the leakage current, which generally refers to the current flowing from one conductor to an adjacent conductor through an insulator, can be maintained at relatively low levels. For example, the numerical value of the normalized leakage current of a capacitor of the present invention is, in some embodiments, less than about 0.1 µA/µF*V, in some embodiments less than about 0.01 µA/µF*V, and in some embodiments, less than about 0.001 µA/µF*V, wherein µA is microamps and µF*V is the product of the capacitance and the rated voltage.

Test Procedures

Equivalent Series Resistance ("ESR")

ESR generally refers to the extent that the capacitor acts like a resistor when charging and discharging in an electronic circuit and is usually expressed as a resistance in series with the capacitor. ESR is typically measured using a Keithley 3330 Precision LCZ meter with Kelvin Leads 2.2 volt DC bias and a 0.5 volt peak to peak sinusoidal signal, at an operating frequency of 100 kHz and temperature of 23° C.±2° C.

Capacitance ("Cap")

The capacitance was measured using a Keithley 3330 Precision LCZ meter with Kelvin Leads with 2.2 volt DC bias and a 0.5 volt peak to peak sinusoidal signal. The operating frequency was 120 Hz and the temperature was 23° C.±2° C.

Dissipation Factor

The dissipation factor was measured using a Keithley 3330 Precision LCZ meter with Kelvin Leads with 2.2 volt DC bias and a 0.5 volt peak to peak sinusoidal signal. The operating frequency was 120 Hz and the temperature was 23° C.±2° C.

Leakage Current

Leakage current ("DCL") was measured using a leakage test set that measures leakage current at a temperature of 23° C.±2° C. and at the rated voltage after a minimum of 60 seconds.

Laser Weld

The laser weld was done using a Trumpf Nd:YaG HAAS laser (emitting near IR light at wavelength around 1,064 nanometers). The energy to weld generally refers to the amount of laser energy required to bond the anode lead to the anode termination component of a leadframe. The energy to weld was measured in Joules.

Example 1

70,000 µFV/g tantalum powder was pressed into a pellet to form a porous body having a length of 1.8 mm, a width of 2.4 mm, and a thickness of 1.2 mm. The tantalum powder was charged into the hopper of a tantalum device automatic molding machine and automatically molded together with two tantalum wires having a diameter of 0.50 mm and pressed to a density of 6.8 g/cm$^3$ to manufacture a porous body. The penetration of wires in the porous body was 70% of the anode length. This molded body was left standing under reduced pressure at 1300° C. to obtain a sintered body.

The tantalum wires were flattened and a carrier tantalum wire having a diameter of 0.19 mm was then welded between the tantalum wires by a resistance welding process as shown in FIG. 18. Thereafter, the carrier wire (e.g., the 0.19 mm diameter tantalum wire) was welded to an auxiliary stainless steel strip.

The tantalum anode was anodized at 14 V in a liquid electrolyte of 0.1% phosphoric acid to make capacitors with 150 µF at 120 Hz. A conductive polymer coating was then formed by dipping the anode into a butanol solution of iron (III) toluenesulfonate (Clevios™ C, H.C. Starck) for 5 minutes and consequently into 3,4-ethylenedioxythiophene (Clevios™ M, H.C. Starck) for 1 minute. After 45 minutes of polymerization, a thin layer of poly(3,4-ethylenedioxythiophene) was formed on the surface of the dielectric. The anode was washed in methanol to remove reaction by-products, anodized in a liquid electrolyte, and washed again in methanol. This process was repeated 12 times. The part was then dipped into a graphite dispersion and dried. Finally, the part was dipped into a silver dispersion and dried. The finished part was completed by conventional assembly technology. A copper-based leadframe was used for finishing of the assembly process. Once the capacitor element was attached to the cathode termination, a laser welding process was used to bond the anode lead wire to the anode termination. Next, the leadframe was enclosed with an encapsulating epoxy resin. Multiple parts (250) of 150 µF/6.3V capacitors were made in this manner.

Comparative Example 2

Capacitors were formed in the manner described in Example 1, except that only a single lead wire with a diameter of 0.50 mm was utilized and the wire was cropped before attaching the wire to the anode termination via a laser welding process. Multiple parts (250) were made in this manner.

Comparative Example 3

Capacitors were formed in the manner described in Example 1, except that only a single lead wire with a diameter of 0.19 mm was utilized. Multiple parts (250) were made in this manner.

Table 1 below summarizes the characteristics of examples discussed above, including the tantalum wire diameters, the laser weld setting, the median DCL, the median capacitance, the median dissipation factor and the median ESR of the finished capacitors.

TABLE 1

| | carrier Ta wire diameter [mm] | Ta wire(s) diameter [mm] | laser weld Energy [J] | DCL [µA] | CAP [µF] | Df | ESR [mΩ] |
|---|---|---|---|---|---|---|---|
| Example 1 | 0.19 | 2 × 0.50 | 6.0 | 24.0 | 133.2 | 1.5 | 15.4 |
| Comparative Example 2 | — | 1 × 0.50 | 6.0 | 19.1 | 137.1 | 1.6 | 19.2 |
| Comparative Example 3 | — | 1 × 0.19 | 6.0 | 7.4 | 144.9 | 1.6 | 35.0 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A solid electrolytic capacitor, the solid electrolytic capacitor comprising:

a capacitor element, wherein the capacitor element comprises a sintered, porous anode body; a dielectric layer overlying the sintered, porous anode body; and a cathode overlying the dielectric layer that includes a solid electrolyte;

a first anode lead having an embedded portion positioned within the sintered, porous anode body and an external portion extending longitudinally from a surface of the sintered, porous anode body in an x-direction;

a second anode lead having an embedded portion positioned within the sintered, porous anode body and an external portion extending longitudinally from a surface of the sintered, porous anode body in an x-direction;

a carrier wire positioned external to the sintered, porous anode body, wherein a first portion of the carrier wire is connected to the external portion of the first anode lead and the external portion of the second anode lead, further wherein a second portion of the carrier wire extends longitudinally away from the surface of the sintered, porous anode body in the x-direction such that the second portion of the carrier wire is parallel to the first anode lead and the second anode lead, wherein the second portion of the carrier wire has a diameter that is smaller than a diameter of the first anode lead and a diameter of the second anode lead, wherein a ratio of the diameter of either the first anode lead or the diameter of the second anode lead to the diameter of the carrier wire ranges from about 1.1 to about 5; and an anode termination, wherein the second portion of the carrier wire is connected to the anode termination.

2. The solid electrolytic capacitor of claim 1, wherein the carrier wire has a diameter ranging from about 50 micrometers to about 300 micrometers.

3. The solid electrolytic capacitor of claim 1, wherein the first anode lead and the second anode lead each have a diameter ranging from about 200 micrometers to about 800 micrometers.

4. The solid electrolytic capacitor of claim 1, wherein the first anode lead, the second anode lead, and the carrier wire comprise tantalum.

5. The solid electrolytic capacitor of claim 1, wherein at least a part of the embedded portion of the first anode lead and a part of the embedded portion of the second anode lead are connected.

6. The solid electrolytic capacitor of claim 1, wherein a part of the embedded portion of the first anode lead, a part of the embedded portion of the second anode lead, or both are flattened, crimped, or compressed.

7. The solid electrolytic capacitor of claim 1, wherein the first portion of the carrier wire extends longitudinally away from the surface of the sintered, porous anode body in the x-direction, further wherein the first portion of the carrier wire is positioned between the external portion of the first anode lead and the external portion of the second anode lead.

8. The solid electrolytic capacitor of claim 1, wherein the first portion of the carrier wire extends across the external portion of the first anode lead and the external portion of the second anode lead in a z-direction perpendicular to the x-direction in which the external portion of the first anode lead and the external portion of the second anode lead longitudinally extend.

9. The solid electrolytic capacitor of claim 1, wherein the external portion of the first anode lead and the external portion of the second anode lead are connected to the first portion of the carrier wire by resistance welding, laser welding, or a combination thereof.

10. The solid electrolytic capacitor of claim 1, wherein the second portion of the carrier wire is connected to an upstanding portion of the anode termination.

11. The solid electrolytic capacitor of claim 1, further comprising a cathode termination that is electrically connected to the cathode.

12. The solid electrolytic capacitor of claim 1, wherein the anode body is formed from a powder comprising tantalum, an electrically conductive oxide thereof, or an electrically conductive nitride thereof.

13. The solid electrolytic capacitor of claim 1, wherein the solid electrolyte comprises a conductive polymer.

14. A method for forming a solid electrolytic capacitor, the method comprising:

positioning a first anode lead and a second anode lead within a powder formed from a valve metal composition, wherein the first anode lead includes an embedded portion located within a porous anode body and an external portion extending longitudinally from a surface of the porous anode body in an x-direction, and wherein the second anode lead includes an embedded portion located within the porous anode body and an external portion extending from a surface of the porous anode body in a longitudinal direction;

compacting the powder around the embedded portion of the first anode lead and the embedded portion of the second anode lead;

sintering the compacted powder to form a sintered, porous anode body;

positioning a carrier wire external to the sintered, porous anode body, wherein the carrier wire comprises a first portion and a second portion, wherein the second portion of the carrier wire has a diameter that is smaller than a diameter of the first anode lead and a diameter of the second anode lead, wherein a ratio of the diameter of either the first anode lead or the diameter of the second anode lead to the diameter of the carrier wire ranges from about 1.1 to about 5;

connecting the first portion of the carrier wire to the first anode lead and the second anode lead; and connecting the second portion of the carrier wire to an anode termination to form an electrical connection between the second portion of the carrier wire and the anode termination, further wherein the second portion of the carrier wire extends longitudinally away from the surface of the sintered, porous anode body in the x-direction such that the second portion of the carrier wire is parallel to the first anode lead and the second anode lead.

15. The method of claim 14, further comprising connecting at least a part of the embedded portion of the first anode lead to a part of the embedded portion of the second anode lead.

16. The method of claim 14, further comprising flattening, crimping, or compressing a part of the embedded portion of the first anode lead, a part of the embedded portion of the second anode lead, or both.

17. The method of claim 14, further comprising positioning the first portion of the carrier wire between the external portion of the first anode lead and the external portion of the second anode lead, wherein the first portion of the carrier wire extends longitudinally away from the surface of the sintered, porous anode body in the x-direction.

18. The method of claim 14, further comprising positioning the first portion of the carrier wire across the external portion of the first anode lead and the external portion of the second anode lead in a z-direction perpendicular to the x-direction in which the external portion of the first anode lead and the external portion of the second anode lead longitudinally extend.

19. The method of claim 14, further comprising:
anodically oxidizing the sintered, porous anode body to form a dielectric layer; and
applying a solid electrolyte to the anodically oxidized sintered, porous anode body to form a cathode;
forming an electrical connection between the cathode and a cathode termination; and
encapsulating the capacitor with a molding material such that at least a part of the anode termination and a part of the cathode termination remain exposed.

* * * * *